United States Patent
Matsumoto et al.

(10) Patent No.: US 6,768,556 B1
(45) Date of Patent: Jul. 27, 2004

(54) NEAR-FIELD OPTICAL PROBE, NEAR-FIELD OPTICAL MICROSCOPE AND OPTICAL RECORDING/REPRODUCING DEVICE WITH NEAR-FIELD OPTICAL PROBE

(75) Inventors: Takuya Matsumoto, Hachioji (JP); Takeshi Shimano, Tokorozawa (JP); Sumio Hosaka, Hinode (JP); Fumio Isshiki, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 561 days.

(21) Appl. No.: 09/665,694

(22) Filed: Sep. 20, 2000

(30) Foreign Application Priority Data

Mar. 13, 2000 (JP) .................................... 2000-073922

(51) Int. Cl.⁷ ...................... G01B 11/24; G01N 21/55
(52) U.S. Cl. ................... 356/601; 356/445; 250/310; 250/311
(58) Field of Search .................. 356/601, 445; 250/309, 310, 311

(56) References Cited

U.S. PATENT DOCUMENTS 5,696,372 A    12/1997   Grober et al.

FOREIGN PATENT DOCUMENTS

| EP | 0981051    | 2/2000  |
|----|------------|---------|
| JP | 11-265520  | 9/1999  |
| JP | 11-316241  | 11/1999 |

OTHER PUBLICATIONS

Physical Review B, vol. 55, No. 12, pp. 7977–7984, 1997 (already submitted).
Appl. Phys. vol. 68, No. 12, pp. 1380–1383, 1999 (translation) (document already submitted).
Appl. Phys. Lett. vol. 68, No. 19, pp. 2612–2614, 1996.
Appl. Phys. Lett. vol. 73, No. 15, pp. 2090–2092, 1998.
JP–A–6–137847.
JP–A–11–101809.
Physical Review B, vol. 55, No. 12, pp. 7977–7984, 1997.
JP–A–11–250460.
The Pacific Rim conference on Lasers and Electro–Optics.
JP–A–11–265520.
Appl. Phys. vol. 68, No. 12, pp. 1380–1383, 1999.

*Primary Examiner*—Frank G. Font
*Assistant Examiner*—Roy M. Punnoose
(74) *Attorney, Agent, or Firm*—Antonelli, Terry, Stout & Kraus, LLP

(57) ABSTRACT

A near-field probe includes a metallic scatterer fabricated on a substrate in a contour of a circular cone, a polygonal pyramid, a planar ellipse, or a triangle and a film of a metal, a dielectric, or a semiconductor formed in a periphery of the scatterer with film thickness equal to height of the scatterer.

20 Claims, 21 Drawing Sheets

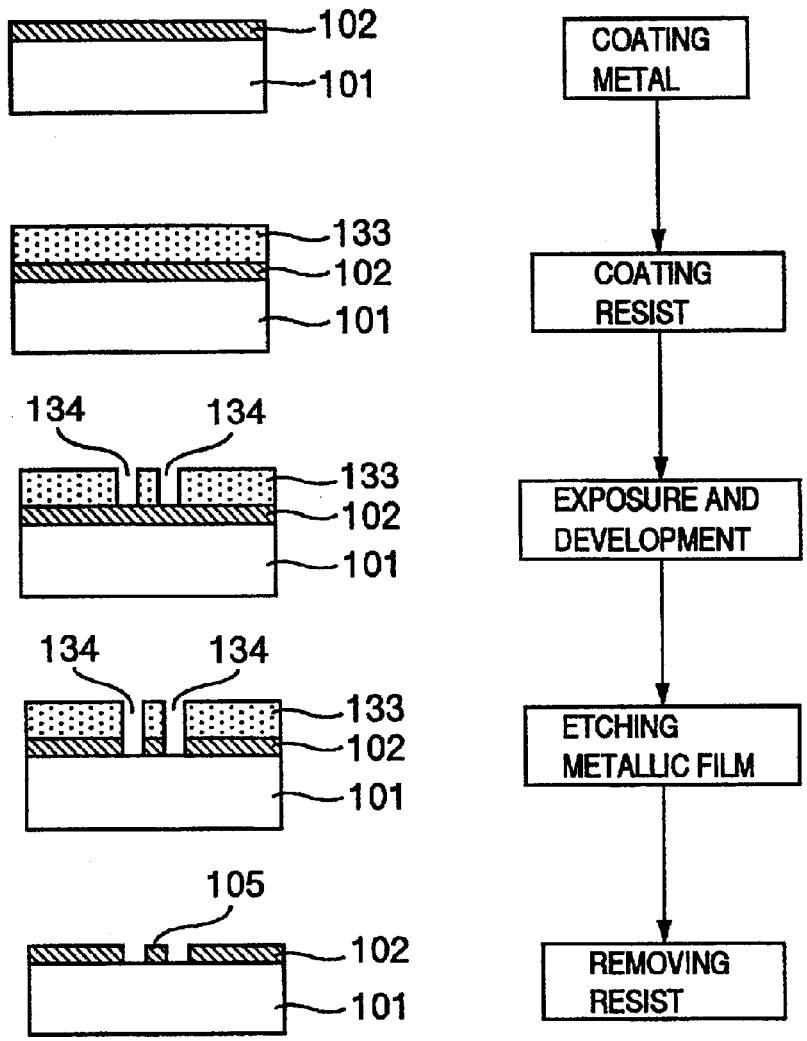

FIG.16A 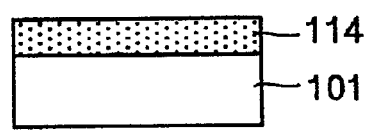 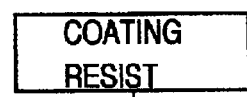
FIG.16B 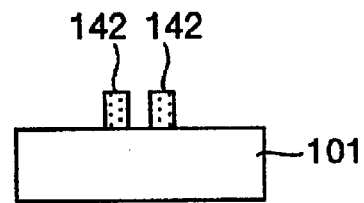 
FIG.16C 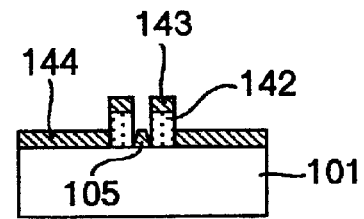 
FIG.16D 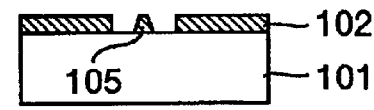 

NEAR-FIELD OPTICAL PROBE, NEAR-FIELD OPTICAL MICROSCOPE AND OPTICAL RECORDING/REPRODUCING DEVICE WITH NEAR-FIELD OPTICAL PROBE

BACKGROUND OF THE INVENTION

The present invention relates to an optical probe to produce or to detect near-field light for use with a near-field optical microscope or a near-field optical recording/reproducing device.

An optical microscope employs a lens to collect or to condense light. In this system, resolution is restricted by a wavelength of the light. In contrast with this optical microscope, a near-field optical microscope uses a near-field optical probe which produces optical near-field location in the vicinity of the probe in place of the lens. The near-field optical probe is placed in the neighborhood of a sample to scan a surface of the sample. It is resultantly possible to measure a contour and optical characteristics of the sample with resolution determined by the size or dimension of the aperture. The near-field optical microscope has been recently applied to various fields such as a field of contour measurement and spectroscopic analysis of, for example, a sample of an organism, quantum structure of a semiconductor, and a macromolecular material as well as a field of high-density optical recording.

As the near-field optical probe, a pointed optical fiber (optical fiber probe) having a fine opening of a size less than a wavelength of light has been usually employed. To fabricate this fiber probe, a tip end section of an optical fiber is extended while being heated. Alternatively, the tip end section is tapered to a point by chemical etching. Thereafter, the optical fiber other than the tip end section is coated with metal. By introducing light to the optical fiber, near-field light can be generated in the proximity of an aperture formed in the tip end section.

However, this fiber probe is attended with a drawback of low light utilization efficiency. When light is incident to a fiber with a fiber probe of this kind having, for example, a diameter of 100 nm, intensity of light emitted from the tip end of the fiber is about 0.001% or less of that of light incident to the fiber. To overcome this problem, various probes have been proposed as follows. (1) Multi-step tapered fiber probe: A fiber probe having a tip end section which is tapered in two or three steps to a point (Applied Physics Letters, Vol. 68, No. 19, pp. 2612–2614, 1996 and Vol. 73, No. 15, pp. 2090–2092, 1998), (2) Metallic needle probe: A probe of a needle of STM. By emitting light to a tip end section of the needle, strong near-field light is produced in the vicinity of the tip end (JP-A-6-137847). (3) Fiber probe with small metallic particle in aperture: A fiber probe in which a very small metallic particle is disposed at a center of an aperture in a tip end section (JP-A-11-101809 proposed by the first inventor of the present invention). Light emitted from the aperture excites plasmon in the small metallic particle to produce strong near-field in the neighborhood of the small metallic particle. (4) Tetrahedral tip: A triangular prism of glass is coated with metal having a thickness of about 50 nm so that surface plasmon is excited on the metal film. The surface plasmon proceeds toward a top end or a vertex of the triangular prism to produce strong near-field light in the proximity of the vertex (Physical Review B, Vol. 55, No. 12, pp. 7977–7984, 1997). (5) Probe on glass substrate with metallic scatterer: A probe including a glass substrate and a metallic scatterer formed on a bottom surface of the glass substrate. This configuration generates strong near-field light in the proximity of the metallic scatterer (JP-A-11-250460).

In the near-field optical microscope, it is necessary to set distance between the aperture to generate near-field light and a surface of a sample to a value ranging from several nanometers to several tens of nanometers. consequently, when the probe including an optical fiber or a glass piece is used, a particular control system is required to control the distance between the tip end of the probe and the sample surface. In general, the distance is measured using interatomic force between the tip end of the probe and the sample surface, and the distance is adjusted by servo control using the measured value.

However, the servo control has a limited servo band and hence the probe scanning speed is limited. Particularly, in an optical recording/reading device to operate at a high data transfer speed, the probe must scan a surface of a recording disk at a high speed. This method cannot appropriately control deviation of an interval of a high frequency caused by distortion and inclination of the disk. To solve this problem, various probes have been proposed as follows. (1) Flat opening probe: A probe fabricated by disposing an opening in a silicon substrate by anisotropic etching (The Pacific Conference on Lasers and Electro-Optics, WL2, "Fabrication of Si planar apertured away for high speed near-field optical storage and readout". Since a peripheral area of the aperture is flat, the distance between the probe and the sample can be kept fixed by pushing the probe against the sample. (2) Probe with aperture having pad: On a bottom surface of a glass substrate, a projection in the form of a quadrangular prism having an aperture in a tip end thereof is fabricated, and a pad is manufactured in a periphery of the projection (JP-A-11-265520). The pad keeps the distance between the probe tip end and a sample. (3) Surface emitting laser probe with small metallic tip: On a laser emitting end surface of a surface emitting laser probe, a small opening and a small metallic projection are fabricated (Applied Physics, Vol. 68, No. 12, pp. 1380–1383, 1999). Since the probe has a flat structure, the distance between the probe and a sample can be kept fixed by pressing the probe against the sample. The probe has a small metallic projection and a resonance structure, the probe expectedly operates with higher efficiency.

The near-field probe requires three points regarding performance as follows. (1) High light utilization efficiency, (2) High scanning, and (3) Reduced background light in light measured by the probe.

To increase the light utilization efficiency, various methods have been proposed as above. The fiber probe having a tip end with multiple taper angles has light utilization efficiency which is about ten times to about one hundred times that of a fiber probe generally used. However, this probe is not fully applicable to applications requiring high light utilization efficiency, for example, to the optical recording/reading requiring a light utilization efficiency of 10% or more. The probe uses an optical fiber and is mechanically fragile and cannot scan at a high speed. The metallic needle probe, the fiber probe with small metallic particle in aperture, the glass probe coated with metal, and the probe on glass substrate with metallic scatterer have increased light utilization efficiency by using characteristics of metal, and hence a high light utilization efficiency can be expected. However, each of these probes has a tip end section with a mechanically fragile contour and hence is not suitable for the high-speed scanning. Particularly, in operation of the metallic needle probe and the probe on glass substrate with metallic scatterer, light which does not hit the tip end section or the scatterer is also incident to the sample. This resultantly leads to a problem of detection of much background light.

Various probes capable of scanning at a high speed have been proposed as above. The flat opening probe and the probe with aperture having pad can achieve the high-speed scanning. However, these probes have low light utilization efficiency. The surface emitting laser probe with small metallic tip expectedly scans at a high speed with high light utilization efficiency and a low amount of background light. To generate strong near-field light using the small metallic projection, the contour of the small metallic projection must be optimized. However, description has not been given of the contour of the small metallic projection at all. Moreover, description has not been given of a method of manufacturing the small metallic projection.

SUMMARY OF THE INVENTION

It is therefore an object of the present invention to provide a near-field optical probe and a method of manufacturing the same which satisfies three requirements above, that is, high light utilization efficiency, high-speed scanning, and little background light in light measured by the probe. Another object of the present invention is to improve the light utilization efficiency by particularly using a metallic scatterer having a size equal to or less than the light wavelength and therefore to provide an optical contour of the scatterer and a method of supplying light to the probe to improve the light utilization efficiency.

According to the present invention, there is provided a near-field optical probe including a substrate, a metallic scatterer fabricated on the substrate in a contour of a circular cone, a triangle, or the like; and a film of a metal, a dielectric, or a semiconductor manufactured in a periphery of the scatterer, the film and the scatterer being substantially equal in height to each other. The metallic scatterer is used to generate strong near-field light, and the film in the periphery thereof is disposed to prevent destruction of the scatterer when the probe is placed in the proximity of a sample to scan the sample at a high speed. By using a light shielding material for the film and by setting the distance between the scatterer and the film to a value equal to or less than the light wavelength, the film functions to reduce background light. To prevent the destruction of the scatterer, there may be manufactured, in place of the fabrication of the film, a dip or recess in a surface of the substrate with depth substantially equal to height of the metallic scatterer. The metallic scatterer is formed in the dip. To further reduce probability of destruction of the scatterer, a light transmitting film may be filled in a gap between the scatterer and the peripheral film and between the scatterer and the dip fabricated on the substrate surface.

The metallic scatterer has a contour of a circular cone, a polygonal pyramid, an ellipse, or a triangle. When the scatterer has a triangular contour, each of two vertices of the triangle may have a radius of curvature larger than that of the other one vertex of the triangle. The film of the triangle may be connected to that of the periphery. In this case, the hole or opening has, at the connecting area, a radius of curvature larger than those of the vertices of the triangle. In fabrication of the scatterer, a metallic film may be formed on a substrate with a tip end in a contour tapered to a point such as a planar ellipse or a planar triangle. In the vicinity of the tapered tip end, another metallic film is manufactured such that the distance between the tip end and the metallic film is equal to or less than the light wavelength. Particularly, it is favorable to fabricate two metallic films each having a tip end section with a tapered contour such that the distance between two tip ends of the metallic films is equal to or less than several tens of nanometers. When the scatterer is formed with a metallic film having a tip end section with a contour of a triangle, an ellipse, or the like; the metallic film may be manufactured on a side surface of the substrate.

The planar or flat substrate may be replaced with a hemispherical substrate to minimize a spot diameter at a focal point of incident light. On the substrate, there may be arranged a light condensing device such as a holographic lens. A metallic scatterer may be disposed on a light emitting edge surface of an optical resonator or a semiconductor laser. When the scatterer includes a film in the contour of an ellipse or a triangle, the film of the ellipse or the triangle may be fabricated on a side surface of the substrate or an inclined surface of the substrate so that only one intersection between a major axis of the ellipse and the ellipse or only one vertex of the triangle is brought into contact with a surface of a sample.

According to the present invention, there is provided a method of manufacturing a near-field optical probe comprising a film forming step of forming a film of a metal, a dielectric, a semiconductor on a substrate, a resist coating step of fabricating a resist film on a film, an exposure and development step of removing the resist film of an area in which a scatterer is to be fabricated, a film etching step of removing part of a film, a scatterer forming step of manufacturing a metallic scatterer in the area from which the resist has been removed, and a resist removal step of removing the resist film. In production of a scatterer in a contour of a circular cone or a polygonal pyramid, the area to remove the resist has a contour of a circle with a diameter equal to or less than a wavelength of light or a contour of a polygonal pyramid with an edge having a length equal to or less than a wavelength of light. In the scatterer forming process, metal is evaporated thereon, and the metal is thick enough to completely cover the hole in the circular or polygonal shape. In the manufacturing the near-field optical probe, the film forming step may be removed such that a substrate etching step to etch the substrate is used in place of the film etching step.

To manufacture a near-field optical probe according to the present invention, there may be employed a manufacturing method including a film forming step of forming a film of a metal, a dielectric, a semiconductor on a substrate, a dip forming step of removing part of the film by photolithography or the like, a resist coating step of fabricating a resist film, an exposure and development step of removing the resist film of an area in which a scatterer is fabricated, a scatterer forming step of manufacturing a metallic scatterer in the area from which the resist has been removed, and a resist removal step of removing the resist film.

In the manufacturing of the probe above, in place of the dip forming step of removing part of the film by photolithography or the like, there by be employed a dip forming step of directly forming a dip in a surface of the substrate by photolithography or the like.

Moreover, the near-field optical probe may be produced in a manufacturing method including a metallic film forming step of forming a film of a metal on a substrate, a resist coating step of fabricating a resist film on the metallic film, an exposure and development step of removing the resist film of a peripheral area in which a scatterer is fabricated, a metallic film etching step of removing the metallic film from the area from which the resist has been removed, and a resist removal step of removing the resist film.

The near-field optical probe may be produced in a near-field optical probe manufacturing method including a resist coating step of fabricating a resist film on a substrate, an exposure and development step of removing the resist film of a peripheral area in which a scatterer is to be fabricated, a metal evaporation step for fabricating a scatterer, and a resist removal step of removing the resist film.

According to the present invention, a near-field optical probe in which the scatterer is protected by an dielectric substance is produced by a manufacturing method including a dielectric film forming step of fabricating a scatterer and a film in a periphery of the scatterer and then manufacturing a dielectric film thereon and a dielectric film polishing step of polishing the dielectric film such that a tip end section of the scatterer exists in a surface region.

To introduce light to the near-field optical probe of the present invention, the focal point of incident light must be at a position of the scatterer. For this purpose, there is employed an automatic focal point adjusting method in which part of light incident to the near-field optical probe is separated, the separated light is fed to a focal point adjusting pattern disposed next to a source of the near-field light to measure a contour of light reflected on the adjusting pattern, and the focal position is adjusted according to a result of the measurement. Particularly, in the focal point adjusting in a direction vertical to the substrate surface, a beam of light reflected from the focal point adjusting pattern is delivered to a convex lens and a cylindrical lens to measure distortion of a contour of a light beam delivered thereto. In the focal point adjusting in a direction parallel to the substrate surface, there is fabricated a focal point adjusting pattern including two small elongated grooves which each have width less than a diameter of a pertinent light spot and which vertically intersect each other. The incident light is divided into three beams of light. A first beam enters the source of near-field light and second and third beams enter a central area of two grooves. Patterns of reflection light from two grooves are measured to detect two bright areas respectively of the patterns. Quantity of light is compared between the bright areas.

When the near-field optical probe of the present invention is applied to an optical recording/reading device in which disks can be changed, it is required to prevent dirt and damage on a surface of the disk. In the optical recording/reading device according to the present invention, a near-field optical probe is incorporated in a cartridge which protects the recording disk. The cartridge has a rotary shaft at a corner thereof. An arm is attached to the rotary shaft. The near-field optical probe is installed on the arm using a suspension. Coupled to the rotary shaft with the arm is an arm on which an optical head including a light source and a light sensor or detector is attached. The optical head moves in cooperation with the near-field optical probe. Light from the optical head is incident to the near-field optical probe via a window disposed in the cartridge. To couple the arm linked with the near-field optical probe with the arm linked with the optical head, a v-shaped groove and a semi-spherical projection are used. When the scatterer includes a metallic projection in the form of a circular cone or a polygonal pyramid or a metallic film fabricated on a side surface of the substrate with a tip end section tapered to a point in the form of a triangle or an ellipse, a metallic film is favorably fabricated below a recording layer of the recording disk to improve resolution and efficiency.

The objects and features of the present invention will become more apparent from the consideration of the following detailed description taken in conjunction with the accompanying drawings.

BRIEF DESCRIPTION OF THE DRAWINGS

FIGS. 1A and 1B are diagrams showing the general configuration of a near-field optical probe according to the present invention in which FIG. 1 is a perspective view and FIG. 2 is a cross-sectional view of the near-field optical probe;

FIGS. 2A to 2E are perspective views showing contours of a metallic scatterer of the present invention in which FIG. 2A shows a circular cone, FIG. 2B shows a planar ellipse, FIG. 2C shows a triangle, FIG. 2D shows a triangle in which a first vertex has a radius of curvature equal to or less than those of two remaining verteces, and FIG. 2E shows a triangle connected to a peripheral film;

FIGS. 3A and 3B are perspective views showing contours of a metallic scatterer of the present invention in which FIG. 3A shows a contour including a metallic film fabricated in the proximity of a vertex of a triangle and FIG. 3B shows another triangle formed in the vicinity of a vertex of a triangle;

FIGS. 4A to 4D are cross-sectional views generally showing a near-field optical probe of the present invention in which FIG. 4A shows a dip fabricated in place of a film in a substrate, FIG. 4B shows a transparent dielectric material filled in a gap between a scatterer and a film, FIG. 4C shows a dip fabricated in a substrate in a substrate and a transparent dielectric material formed in a periphery of a scatterer, and FIG. 4D shows a dielectric film fabricated without gap between a scatterer and the dielectric film;

FIGS. 5A and 5B are diagrams to explain distribution of intensity of near-field light emitted when light is incident to a triangular metallic film in which FIG. 5A shows a calculation method and FIG. 5B shows a result of calculation (a graph showing a ratio of intensity of the emitted light to that of the incident light);

FIGS. 6A and 6B are diagrams to explain distribution of intensity of near-field light emitted when light is incident to two opposing triangular metallic films in which FIG. 6A shows a calculation method and FIG. 6B shows a result of calculation (a graph showing a ratio of intensity of the emitted light to that of the incident light);

FIGS. 7A and 7B are perspective views to explain a method of supplying light to a triangle in which FIG. 7A shows a method of emitting light only to a tip end section of the triangle and FIG. 7B shows a method of emitting light to the triangle to generate a surface plasmon on a surface of the metallic film;

FIGS. 9A to 9D are cross-sectional views showing a method of illuminating light to a near-field optical probe of the present invention in which FIG. 9A shows a method to condense light through a lens externally arranged, FIG. 9B shows a substrate in a semi-spherical contour, FIG. 9C shows a holographic lens fabricated on a substrate, and FIG. 9D shows light incident to the probe to satisfy a condition of total reflection.

FIGS. 12A to 12F are schematic diagrams showing processes of manufacturing a near-field optical probe in which FIG. 12A is a film forming process, FIG. 12B is a resist coating process, FIG. 12C is an exposure and development process, FIG. 12D is a film etching process, FIG. 12E is a scatterer forming process, and FIG. 12F is a resist removal process;

FIGS. 14A to 14F are schematic diagrams showing processes of manufacturing a near-field optical probe in which FIG. 14A is a film forming process, FIG. 14B is a dip forming process, FIG. 14C is a resist coating process, FIG. 14D is an exposure and development process, FIG. 14E is a scatterer forming process, and FIG. 14F is a resist removal process;

FIGS. 15A to 15E are schematic diagrams showing processes of manufacturing a near-field optical probe in which FIG. 15A is a metallic film forming process, FIG. 15B is a resist coating process, FIG. 15C is an exposure and development process, FIG. 15D is a metallic film etching process, and FIG. 15E is a resist removal process;

FIGS. 16A to 16D are schematic diagrams showing processes of manufacturing a near-field optical probe in which FIG. 16A is a resist coating process, FIG. 16B is an exposure and development process, FIG. 16C is a metal coating process, and FIG. 16D is a resist removal process;

FIGS. 17A and 17B are schematic diagrams showing processes of manufacturing a probe including a scatterer coated with a transparent dielectric substance in which FIG. 17A shows a dielectric film forming process and FIG. 17B shows a dielectric film polishing process;

FIGS. 19A to 19D are diagrams schematically showing a relationship between a focal point adjusting mark and a light beam in the automatic focal point adjusting method in which FIG. 19A shows a positional relationship between a contour of a mark formed on a probe and a light beam, FIG. 19B shows a shape of a detector or sensor and a contour of a light beam on the sensor when the focal point is adjusted, FIG. 19C shows a contour of the light beam on the sensor when the light beam position is horizontally shifted with respect to the substrate surface of the probe, and FIG. 19D shows a contour of the light beam on the sensor when the light beam position is vertically shifted with respect to the substrate surface of the probe;

FIGS. 20A and 20B are perspective views showing a system configuration when a near-field optical probe of the present invention is applied to an optical recording/reading device in which FIG. 20A shows an overall configuration of the system and FIG. 20B shows an optical system thereof;

FIGS. 21A to 21C are diagrams showing a configuration of an optical disk cartridge integrated in a near-field optical probe in which FIG. 21A shows an overall configuration in a perspective view, FIG. 21B shows a cross-sectional view of the configuration, and FIG. 21C shows a v-shaped groove and a semispherical projection to couple an arm in the cartridge with an arm outside the cartridge; and FIGS. 22A and 22B are cross-sectional views for explaining a near-field optical recording/reading method using an optical disk with a metallic film in which FIG. 22A is a cross-section for explaining operation when a probe includes a metallic scatterer in the contour of a circular cone and FIG. 22B is a cross-section for explaining operation when a probe includes a triangular film on a side surface of the substrate.

DESCRIPTION OF THE EMBODIMENTS

Description will now be given of specific embodiments in accordance with the present invention.

Figure 1A:
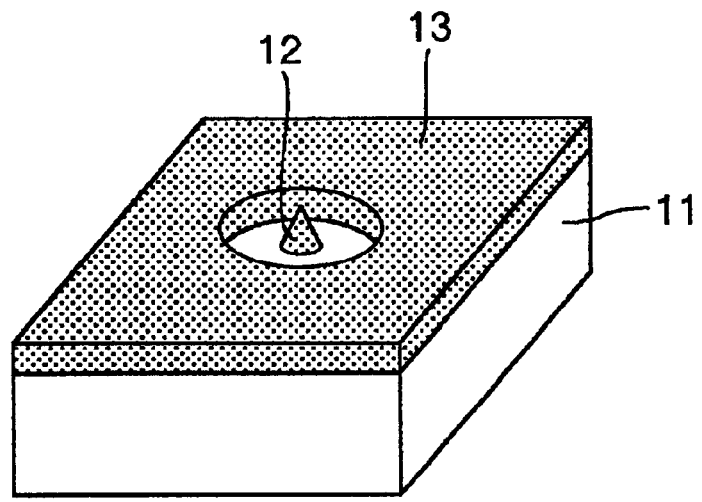
Figure 1B:
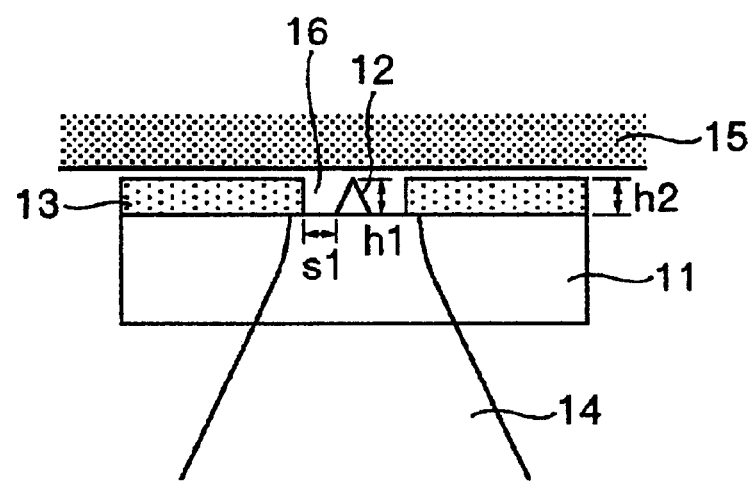

FIGS. 1A and 1B show constitution of a near-field optical probe of the present invention including a light transmitting substrate 11, a metallic scatterer 12 having a contour shown in FIGS. 2A to 2E or FIGS. 3A and 3B, and a film 13 fabricated in a periphery of the scatterer 12 using a metal, a dielectric, a semiconductor, or the like. The substrate 11 is made of, for example, quartz. The scatterer 12 is made of, for example, gold or silver. The film 13 is made of, for example, gold, silver, titanium, or silicon.

The scatterer 12 functions to generate strong near-field light. Light 14 collected by a lens or the like is incident to the substrate 11 as shown in FIG. 1B and hits the scatterer 12. The light 14 is scattered by the scatterer 12 to generate near-field light having high spatial frequency components in the proximity of the scatterer 12. When efficiency of scattering of the scatterer 12 is higher, intensity of the near-field light becomes stronger. Therefore, strong near-field light is generated in the vicinity of a scatterer made of a metal having high scattering efficiency.

Figure 4A:
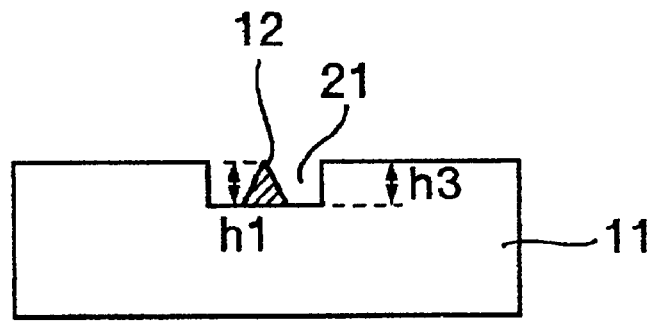
Figure 4B:
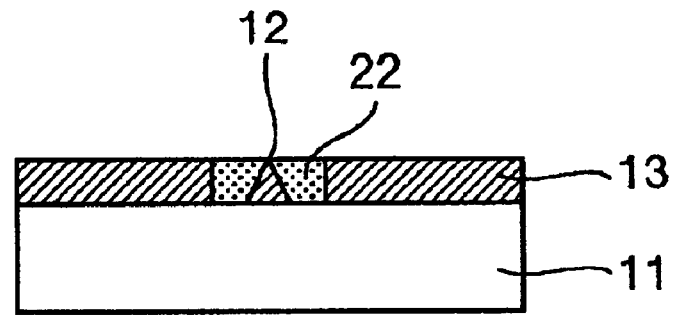

The film 13 prevents, when the scatterer 12 is placed at a position near a sample 15, the scatterer 12 from colliding against a surface of the sample 15. Namely, destruction of the scatterer 12 is prevented. The height h2 of the film 13 must be therefore substantially equal to the height h1 of the scatterer 12. To prevent destruction of the scatterer 12, it may also be possible, without fabricating the film 13, to dig the substrate down to a depth of h3 substantially equal to the height h1 of the scatterer 12 as shown in FIG. 4A to form a dip 21 in which a scatterer is to be formed. As can be seen from FIGS. 4B and 4C, a gap between the film 13 and the scatterer 12 or the dip 21 in which the scatterer 12 is fabricated may be filled with a dielectric material 22. This further reduces probability of the destruction of the scatterer 12.

The film 13 is desirably made of a light interrupting or shielding substance (which reflects or absorbs light) such as a metal or a semiconductor, and a gap S1 between the film 13 and the scatterer 12 is desirably equal to or less than several tens of nanometers. For example, the film 13 is made of gold, titanium, or silicon with the gap S1 set to about 50 nm. By using the light shielding film, when measuring a contour and optical characteristics of a sample and when reproducing a record mark in an optical recording/reading device, it is also possible to increase contrast in a reproduced image and/or a reproduced signal. That is, a beam of light to hit the scatterer 12 has a beam diameter, which however cannot be reduced to a value similar to a size of the scatterer because of a diffraction limit. Therefore, part of the light is not scattered and is incident as background light to the sample 15. This resultantly increases a ratio of lower-degree space frequency components to the light incident to the sample 15 and hence the contrast of the image and the reproduced signal is decreased. By fabricating a light shielding film 13 such that a distance s1 between the film 13 and the scatterer 12 is equal to or less than the wavelength of light, the light which has not hit the scatterer 12 is reflected or absorbed by the film 13. Quantity of background light incident to the sample 15 can be therefore minimized.

When the film 13 is made of a metal, a gap is required between the scatterer 12 and the metallic film 13. However, when the film 13 is made of a material other than a metal, for example, is made of a dielectric substance, the film 13 may be manufactured to be contiguous to the scatterer 12 as shown in FIG. 4D.

Figure 2A:
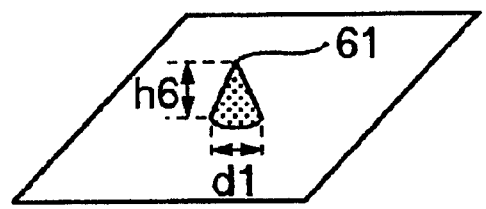

The scatterer 12 is fabricated in a circular cone or a polygonal pyramid as shown in FIG. 2A. When light is incident to the scatterer 12, strong near-field light is produced in the vicinity of a vertex 61 of the scatterer 12. The vertex 61 has a radius of curvature of, for example, 20 nm; a height h6 of, for example, 100 nm; and a width (diameter) d1 of a base or bottom plane of, for example, 100 nm. The radius of curvature of the vertex 61 need only be 50 nm or less. However, this value is favorably reduced to obtain higher resolution. Each of the height and the width of the base plane need only be several hundred nanometers. However, the radius of curvature, the height, and the width of the base plane of the vertex are desirably adjusted to have a ratio therebetween for a resonance condition of a plasmon, which will be described later.

Figure 2B:
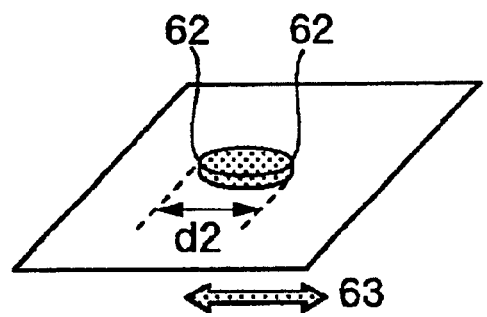

The contour of the scatterer may be a planar ellipse (including a circle) as shown in FIG. 2B. The elliptic contour has a major axis having a length of, for example, 150 nm; a minor axis having a length of, for example, 50 nm; and a thickness of, for example, 40 nm. It is only necessary that each of the major axis and the minor axis is several hundred nanometers or less and the thickness is 100 nm or less. However, these values are desirably adjusted to have a ratio therebetween for a resonance condition of a plasmon, which will be described later. When light enters the elliptic film of the scatterer, strong near-field light is produced in the vicinity of intersections 62 between the major axis and the ellipse (to be referred to as vertices 62 in this specification). To generate particularly strong near-field light, the major axis of the ellipse is desirably set to be parallel with a direction of polarization of light.

Figure 2C:
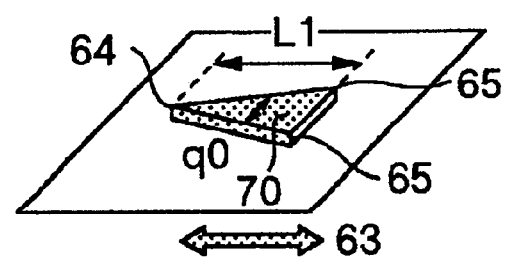
Figure 5A:
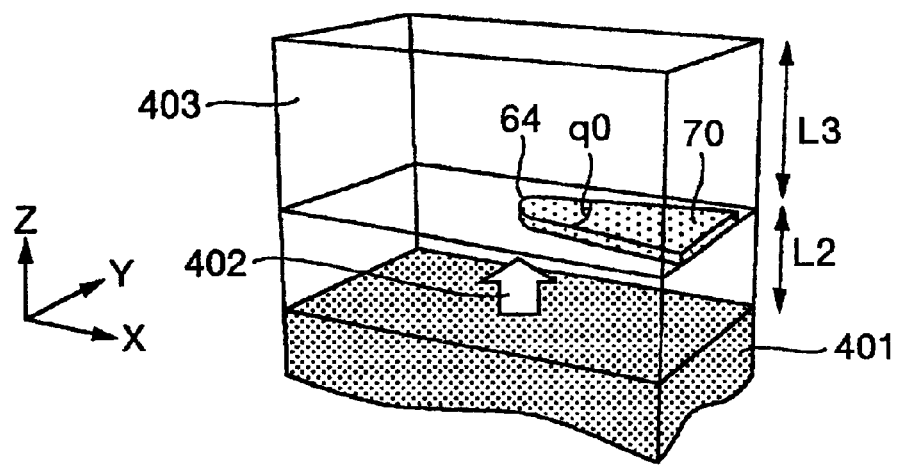
Figure 5B:
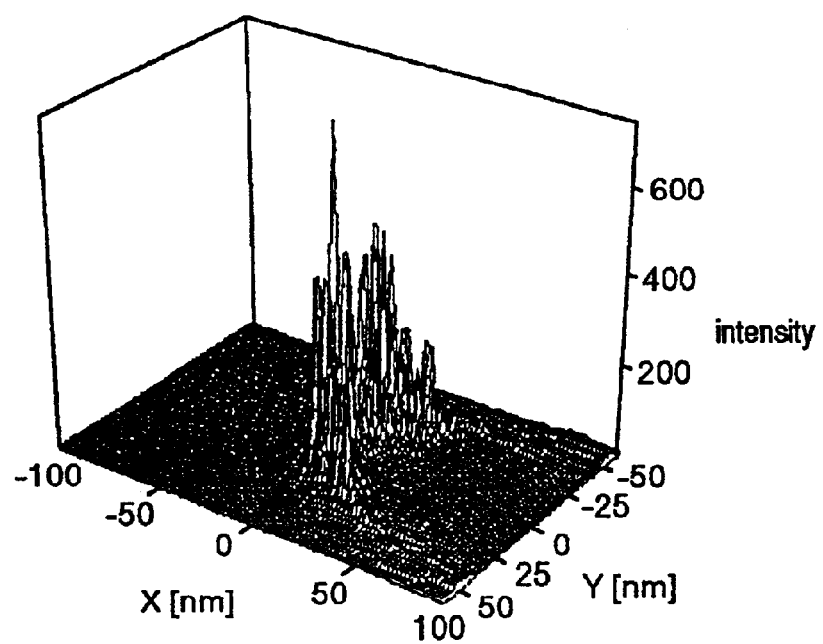

The scatterer may be fabricated in a triangular form 70 with a film as shown in FIG. 2C. The triangle has a vertex 64 having a radius of curvature of, for example, 15 nm and a thickness of, for example, 30 nm. It is only necessary that the radius of curvature is 100 nm or less and the thickness is 100 nm or less. The vertex 64 desirably has an inner or code angle satisfying the plasmon resonance condition, which will be described later. When light is emitted to the vertex 64 with a direction of polarization of light aligned to the vertex 64, electrons are concentrated in the neighborhood of the vertex 64 sharply pointed and hence strong near-field light is generated therein. FIGS. 5A and 5B show calculation results of distribution of near-field light generated in the proximity of the triangular metallic film when light is incident to the triangular metallic film. The calculation is achieved in an FDTD method (Journal of Optical Society of America A, Vol. 12, No. 9, pp. 1974–1983, 1995). In this calculation, an analysis area 403 is 0.3 micrometer ($\mu$m), 0.2 $\mu$m, and 2.6 $\mu$m respectively in the x, y, and z directions. The triangular film is made of gold and has a thickness of 30 nm. The vertex 64 has a radius of curvature of 25 nm and a cone angle q0 of 20°. An incident wave 402 is a plane wave having a wavelength of 650 nm. A wave source 401 is set to a place one wavelength apart from the film (L2=650 nm). The incident wave has a direction of polarization aligned to the x axis. The analysis area has boundary conditions such as a periodic boundary condition in a plane vertical to the x and y axes and an absorption boundary condition in a plane vertical to the z axis. The metallic film is one wavelength apart from the boundary (L3=one wavelength) and the wave source is also one wavelength apart from the boundary. The number of meshes are represented as 60, 50, and 60 in the x, y, and z directions and the meshes are uneven meshes, namely, the mesh is smaller in the vicinity of the vertex of the triangular film. That is, the mesh pitch or interval is 2.5 nm in the vicinity of the vertex of the triangular film. The time pitch is $1 \times 10^{-18}$ second and the iteration of calculation is 15000. The calculation results of FIG. 5B show a ratio of a density of intensity of near-field light ($I_{near}$) to a density of intensity of the incident wave. As can be seen from this graph, a field of strong light is produced in the vicinity of the vertex 64 and the field has a maximum intensity value which is about 750 times that of the incident light. The half-value width is 15 nm and 45 nm in the x and y directions, respectively. The film may be made of other metal. When the film is made of, for example, silver, there is attained almost the same distribution of intensity of light and a maximum intensity value is about 590 times that of the incident light. The distribution of the near-field light in the proximity of the vertex of the metallic film having an elliptic contour can be considered to be almost the same as the results above because of similarity of the contour.

Figure 2D:
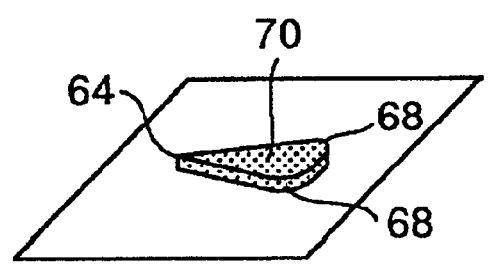
Figure 2E:
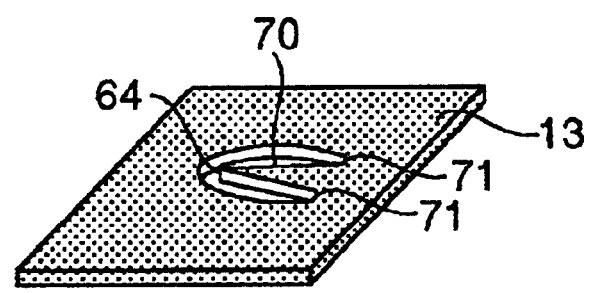
Figure 7A:
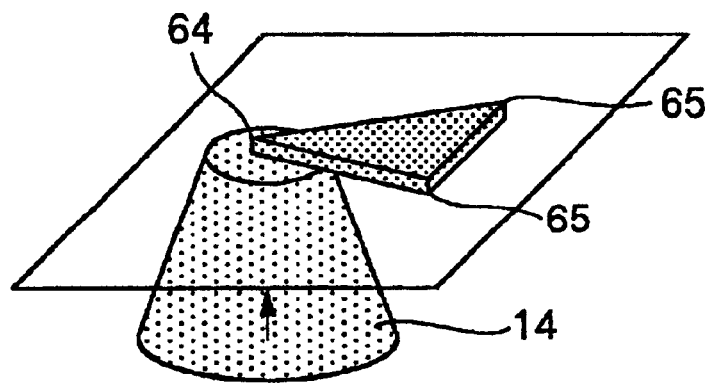

When the length L1 of the triangle is equal to or less than the wavelength of light, for example, 200 nm, strong near-field light is generated also in the vicinity of the other vertices 65. It is therefore desirable that the length L1 is longer than the wavelength of light, for example, one micrometer so that light hits only the pointed vertex 64 as shown in FIG. 7A. Alternatively, to reduce intensity of the near-field light in two vertices other than the pointed vertex 64, it may also be possible to increase the curvature of the vertices 68 as shown in FIG. 2D. In this situation the length L1 of the triangle may be equal to or less, than the wavelength of light. When the vertex 64 has a radius of curvature of 10 nm, the radius of curvature of each vertex 68 is 50 nm or more and the length L1 is about 300 nm. This minimizes the degree of concentration of electrons onto the vertex 68 and hence lowers the intensity of near-field light generated in the vicinity of the vertex 68. Additionally, as can be seen from FIG. 2E, the triangular scatterer 70 may be connected to a film 13 in a periphery of the scatterer 70. In this case, the curvature of at junction area 71 is favorably greater than the radius of curvature of the vertex 64. Also in this situation, the length L1 of the triangle may be equal to or less than the wavelength of light. When the radius of curvature of the vertex 64 is 10 nm, the radius of curvature of the junction 71 is 50 nm or more and the length L1 is about 300 nm.

Figure 3A:
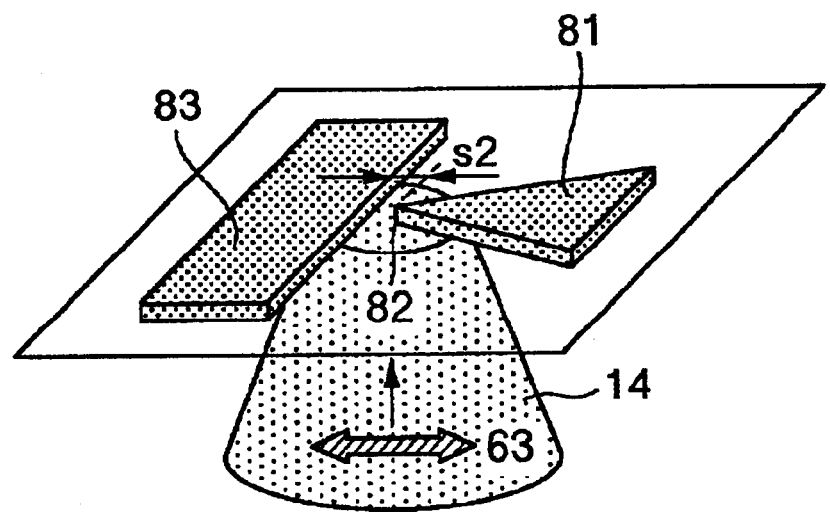

As shown in FIG. 3A, a scatterer may include a metallic film 83 fabricated in the vicinity of a vertex of a pointed metallic film 81 in the form of a planar ellipse or triangle. To fabricate this scatterer, a 30 nm thick triangular film is formed with a vertex having a radius of curvature of 15 nm. Thereafter, a 30 nm thick rectangular film is manufactured apart 5 nm from the vertex of the triangle (gap S2=5 nm). It is only required that the radius of curvature of the triangle is 100 nm or less and the thickness of the triangular film is 100 nm or less. The vertex desirably has a cone angle satisfying a plasmon resonance condition, which will be described later. The rectangular film and the triangular film have an equal thickness. The gap S2 may be several tens of nanometers or less. To obtain high resolution, the gap S2 is desirably minimized. The incident light has a direction of polarization directing to the vertex 82 as indicated by an arrow 63 to illuminate an area between the vertex 82 and the film 83. Dipole occurs in the vertex 82 and on the metallic film 83. By interaction between each dipole, strong near-field light is generated between the vertex 82 and the metallic film 83.

Figure 3B:
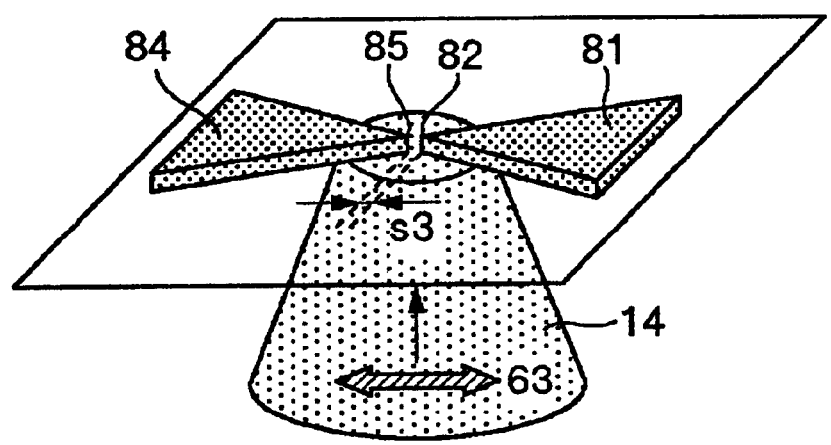
Figure 6A:
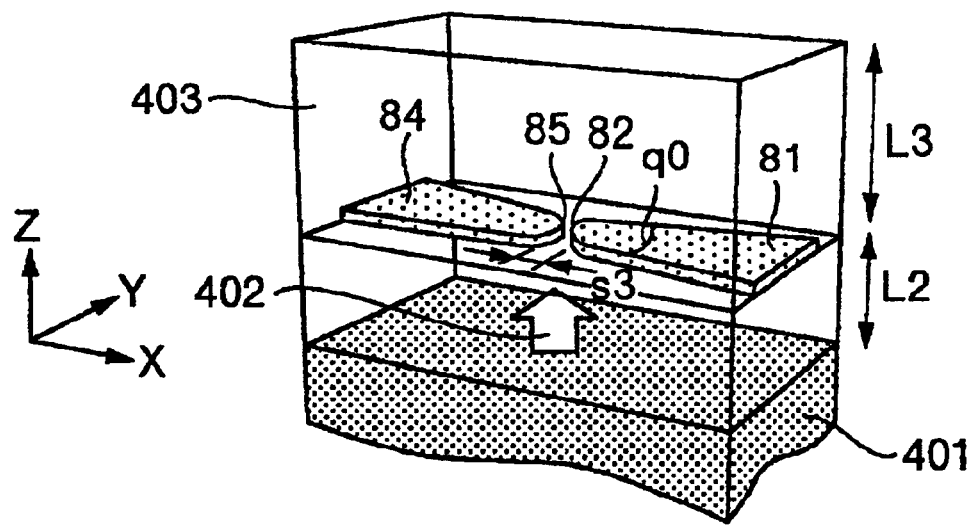
Figure 6B:
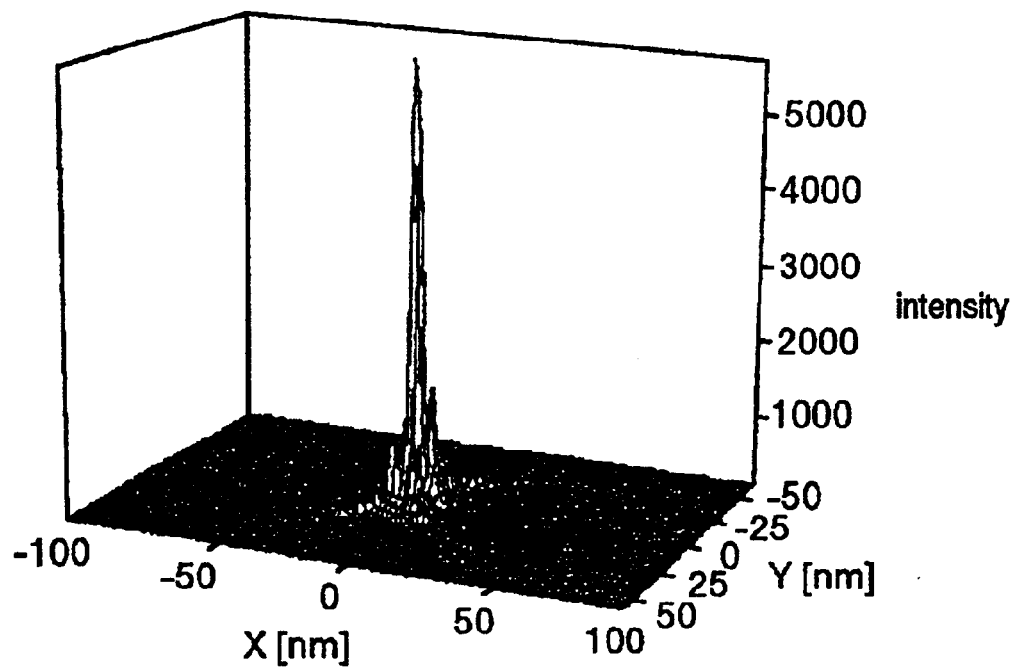

As can be seen from FIG. 3B, the metallic film 83 is particularly desirably fabricated as a film 84 having, like the metallic film 81, a pointed tip end section in the form of a planar ellipse or a triangle. The vertex B2 is disposed near the vertex 83. For example, two triangles are fabricated using a film having a film thickness of 30 nm and the pertinent vertex of each triangle has a radius of curvature of 15 nm. These triangles are apart from each other by a gap S1 of 5 nm. In each triangle, it is only required that the radius of curvature of the pertinent vertex is 100 nm or less, the thickness is 100 nm or less, and the gap between the vertices S3 is several tens of nanometers. To obtain high resolution, the gap S3 is desired to be reduced. The incident light has a direction of polarization directing to the vertex 82 as indicated by an arrow 63. In this configuration, dipole occurs strongly in two metallic films. As a result of interaction of each dipole, strong near-field light is generated between two vertices. FIGS. 6A and 6B show calculation results of distribution of near-field light generated when light is incident to two mutually opposing triangles. The calculation is executed in the FDTD method. In the calculation, as shown in FIG. 6A, an analysis area 403 has a size represented as 0.3 $\mu$m, 0.2 $\mu$m, and 2.6 $\mu$m respectively in the x, y, and z directions. The triangular film is made of gold and has a film thickness of 30 nm. The pertinent vertex has a radius of curvature of 25 nm and a cone angle g0 of 20°. An incident wave 402 is a planar wave having a wavelength of 780 nm. A wave source 401 is one wavelength apart from the film (L2=780 nm). The incident wave has a direction of polarization aligned to the x axis direction. The analysis area has boundary conditions such as a periodic boundary condition in a plane vertical to the x and y axes and an absorption boundary condition in a plane vertical to the z axis. The metallic film is one wavelength apart from the boundary (L3=one wavelength) and the wave source is also one wavelength apart from the boundary. The number of meshes are represented as 60, 50, and 60 in the x, y, and z directions. The meshes are uneven meshes in which the mesh is smaller in the vicinity of the pertinent vertex of the triangular film. Specifically, the mesh pitch or interval is 2.5 nm in the vicinity of the vertex of the triangular film. The time pitch is $1 \times 10^{-18}$ second and the iteration of calculation is 15000. FIG. 6B shows, in a graph, distribution of a ratio of a density of intensity of near-field light ($I_{near}$) to a density of intensity of the incident wave. As can be seen from this graph, a field of strong light is produced in the gap between the vertices 82 and 85, and the field has a maximum intensity value which is about 5700 times that of the incident light. The half-value width is 15 nm and 45 nm in the x and y directions, respectively. The film may be made of other metal. When the film is made of, for example, silver, there is attained almost the same distribution of intensity of light and a maximum intensity value is about 5500 times that of the incident light.

When the scatterer is fabricated using a metallic film in the form of a circular cone, a polygonal pyramid, an ellipse, or a triangle in the order of nanometers, the intensity of near-field light generated in the vicinity of the scatterer may be increased by producing a localized plasmon in the scatterer. The localized plasmon is a state of resonance of electrons appearing in an elliptic body having a size equal to or less than the wavelength of light or in a metallic projection (such as the vertex of a circular cone or the vertex of the elliptic or triangular film) sharply pointed to have a radius of curvature equal to or less than the wavelength of light. When the localized plasmon takes place, a field of quite strong light is generated in the vicinity of the metal. The localized plasmon is excited by light having a particular wavelength and its resonance wavelength is determined by a type of the metal, a contour of the metal, and a direction of polarization of the exciting light. It is therefore desirable that these parameters are selected such that the resonance wavelength is similar to that of a source of the exciting light. For example, when the contour of the scatterer can be approximated to a sphere and the metal is gold, the resonance wavelength is 520 nm. The density of intensity of near-field light in the vicinity of the scatterer is 30 times that of intensity of incident light. When the metal is silver, the resonance wavelength is 350 nm, the density of intensity of near-field light in the vicinity of the scatterer is 480 times that of intensity of incident light. In a case in which the contour of the scatterer can be approximated to a spheroid in which a ratio between a major axis to a minor axis is three to one and the metal is gold, the resonance wavelength is 650 nm and the density of intensity of near-field light in the vicinity of the scatterer is 6500 times that of intensity of incident light. When the metal is silver, the resonance wavelength is 500 nm, the density of intensity of near-field light in the vicinity of the scatterer is $10^5$ times that of intensity of incident light. It has been assumed that the direction of polarization of the exciting light is parallel to the major axis to the elliptic metal. For the metallic film having a contour of a sphere, the contour has point symmetry and hence the direction of polarization can be arbitrarily selected. The calculation results indicate that quite strong near-field light is produced in the proximity of the elliptic, metallic film. The vertex having a contour of a circular cone or a triangle can be approximately considered to have a contour of an ellipse having a large ratio between the major axis and the minor axis. Therefore, by optimizing the contour and the material, the increase in the electric field of the elliptic scatterer can be expected.

Figure 7B:
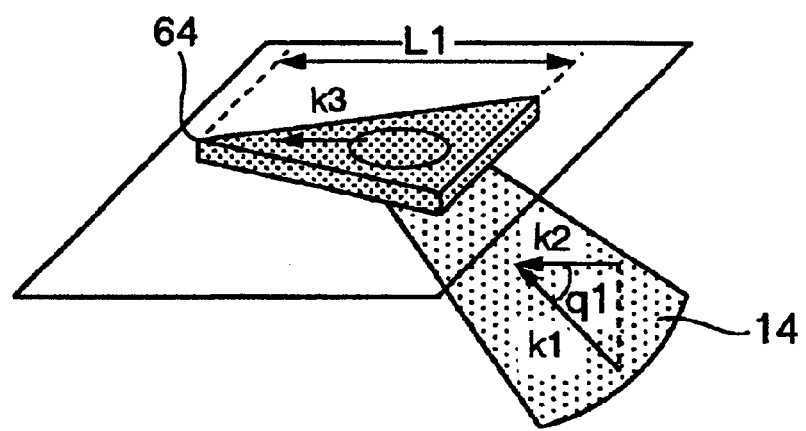

When the scatterer is fabricated with a metallic film in a triangular contour, light may be illuminated to excite a surface plasmon wave on the metallic film. For this purpose, as can be seen from FIG. 7B, the direction of polarization of the light is aligned to be parallel to a plane of incidence of the light (p polarization). To make a wave number k3 of the surface plasmon wave match of a component in a direction of plane k2 of wave number vector k1 of the incident light, an angle of incidence q1 is adjusted. For example, when the metal is gold and the film thickness is 40 nm, q1 is set to 44.5°. The length L1 of the triangle is, for example, several micrometers, namely, equal to or more than the wavelength of light. The light spot is at a position on the metallic film. The direction of a plane of incidence of light is aligned such that the surface plasmon wave proceeds toward the vertex 64. In this configuration, the surface plasmon wave generated on the metallic film is collected onto the sharply pointed vertex 64, and strong near-field light is generated in the proximity of the vertex 64.

Figure 8A:
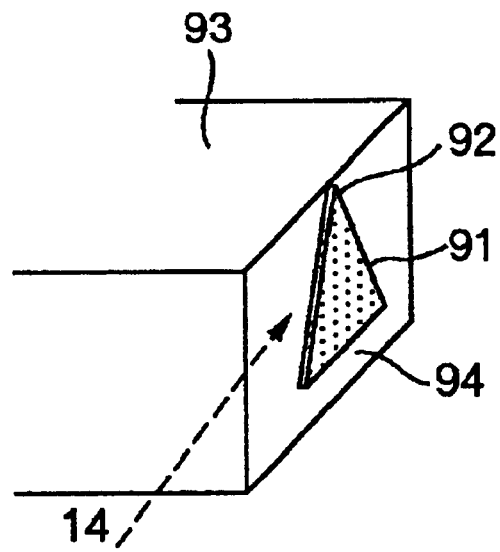
FIG. 8A is a perspective view of a probe in which a rectangular film is fabricated on a side surface of the substrate.
Figure 8B:
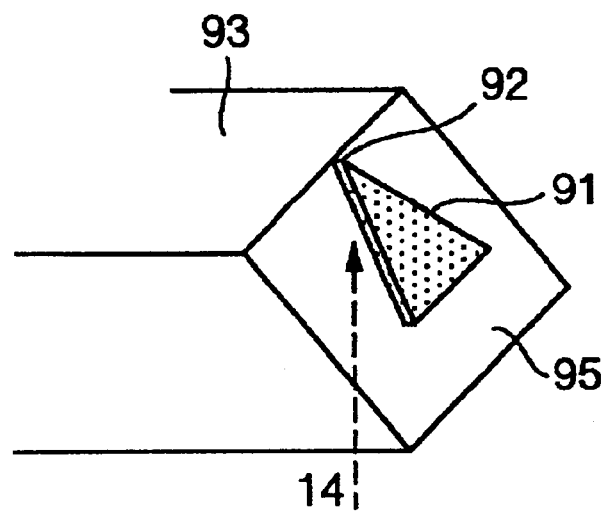
FIG. 8B is a perspective view of a probe in which a rectangular film is fabricated on an inclined side surface of the substrate.

When the scatterer is fabricated with a metallic film in a sharply pointed contour of a planar ellipse or a triangle, the metallic film 91 may be fabricated on a side surface 94 of the substrate as shown in FIG. 8A. A vertex 92 to generate strong near-field light is brought into contact with a bottom plane 93 of the substrate. The side surface 94 of the substrate may be inclined as shown in FIG. 8B. In this situation, light 14 can be supplied in a direction vertical to the bottom plane 93. To protect the metallic film 91, a surface of the metallic film 91 may be coated with a transparent dielectric substance.

Figure 9A:
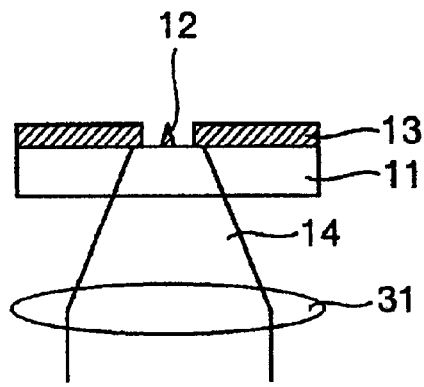
Figure 9B:
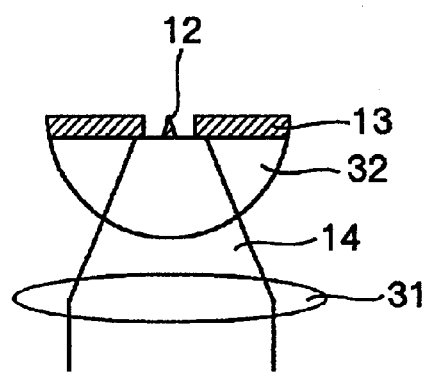
Figure 9C:
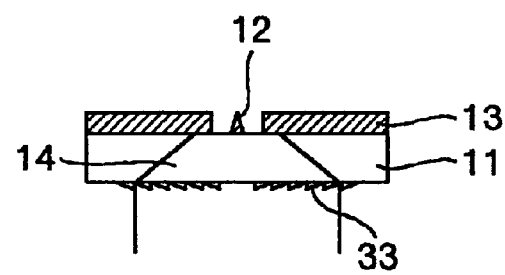
Figure 9D:
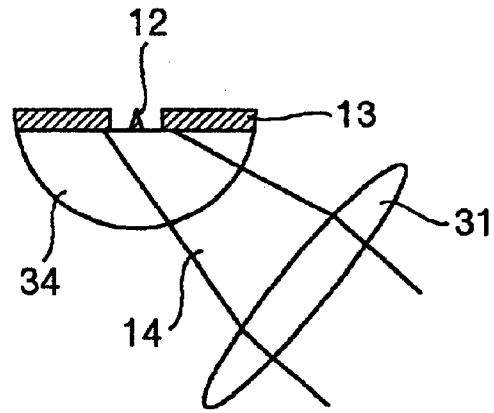

The collated or focused light 14 is fed to the scatterer 12, for example, as shown in FIGS. 9A to 9D. In the example, of FIG. 9A, light is condensed by an objective lens 31 disposed near the substrate and is incident to the scatterer 12. In the example of FIG. 9B, the substrate 32 has a semispherical contour. The light collated by the objective lens 31 is incident to the substrate 32. This improves a numerical aperture of the lens 31 so that a beam diameter of the light is smaller at the focal point when compared with that of FIG. 9A. In the example of FIG. 9C, a light collecting or condensing mechanism 33 such as a holographic lens is fabricated on the substrate. A collimated light incident to the substrate is focused onto the scatterer 12. In the example of FIG. 9D, the substrate is formed in a spherical prism or a right angle prism such that the collated light totally reflects on a substrate surface of the scatterer 12. This minimizes quantity of background light incident to a sample.

Figure 10:
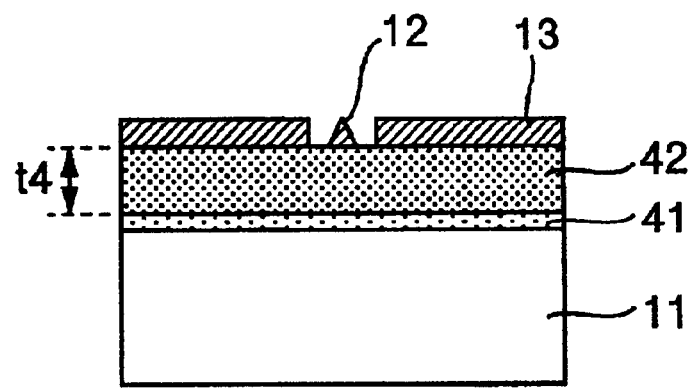
FIG. 10 is a cross-sectional view showing a metallic scatterer fabricated in an edge surface of an optical resonator.

The scatterer 12 may be manufactured on an edge surface of an optical resonator. For example, as shown in FIG. 10, a light reflecting film such as a metallic film is fabricated on a substrate 11 and then a light transmitting film such as a dielectric film is formed thereon with a thickness of t4 to satisfy $t4 \times n4 = N \times \lambda/2$, where n4 is a refractive index of the dielectric, $\lambda$ is a wavelength of light in the air, and N is an integer equal to or more than one. A scatterer 12 and a reflecting film 13 are fabricated thereon to form a resonator structure. By this structure, it is possible to increase intensity of the electric field of light incident to the scatterer 12. This therefore increases intensity of near-field light generated in the vicinity of the scatterer 12.

Figure 11:
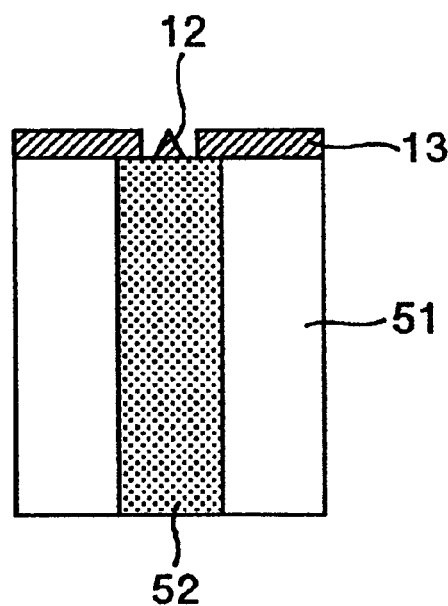
FIG. 11 is a cross-sectional view showing a metallic scatterer fabricated in an edge surface of a semiconductor laser.

As shown in FIG. 11, the scatterer 12 may be formed on a laser emitting surface of an active layer 52 of a laser 51. The semiconductor laser may be a laser of surface emission type. Like the scatterer formed on the edge surface of the resonator, this scatterer can increase intensity of near-field light. Moreover, the lens can be dispensed with.

The near-field optical probe is manufactured as follows.

Figure 12:
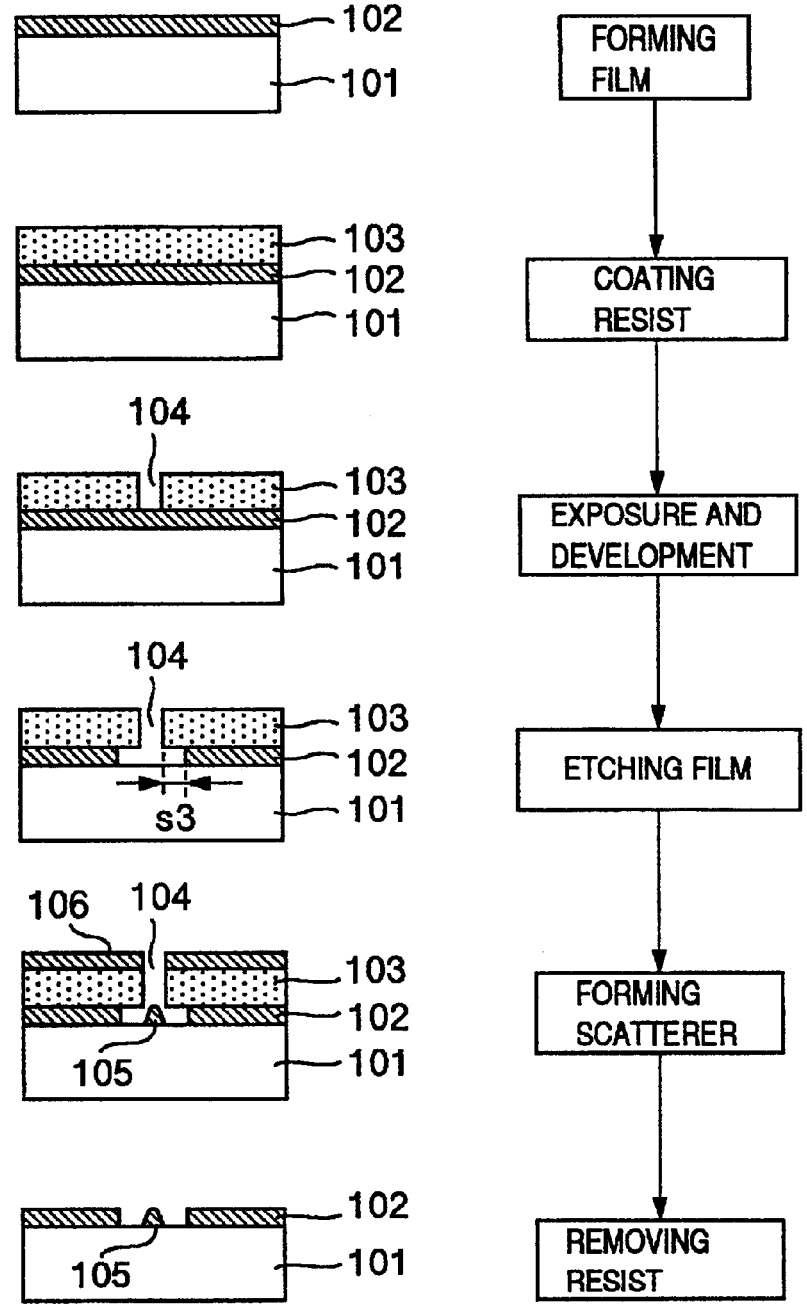

On a substrate 101, a film 102 of a metal, a dielectric substance, or a semiconductor is manufactured by a vacuum evaporator and a sputtering unit as shown in FIG. 12A. The film has a thickness substantially equal to height of the scatterer (film forming process).

A positive electron-beam resist 103 is coated on the film (FIG. 12B). A region 104 to form a scatterer is exposed to light by an electron-beam exposing device (FIG. 12C). The exposed region 104 is removed in developing liquid (exposure process).

Next, the film 102 of the exposed region 104 is removed (FIG. 12D). The film is removed using etchant or etching solution or liquid. When the metallic film is made of gold, nitrohydrochloric acid is utilized to etch the film. When the etching time is elongated, the etching solution enters a space below the resist film 103 and hence a region larger than the exposed region 104 is removed. The space has a length of s3. This length is substantially equivalent to the gap s1 between the scatterer and the film of FIG. 1B. The film may be removed by a plasma etching device. However, since the etching solution does not enter the space above in this case, the length s3 is equal to zero. Consequently, there is produced a probe in which the scatterer is brought into contact with the film (FIG. 4D).

As can be seen from FIG. 12E, a metal is accumulated by a vacuum evaporator. In the region 104 from which the resist has been removed, the metal is accumulated to form a scatterer 105 (scatterer forming process).

Finally, the resist and the metallic film 106 are removed in a resist remover solution. The probe thus completely produced includes a scatterer 105 and a film 102 as shown in FIG. 12F.

Figure 13:
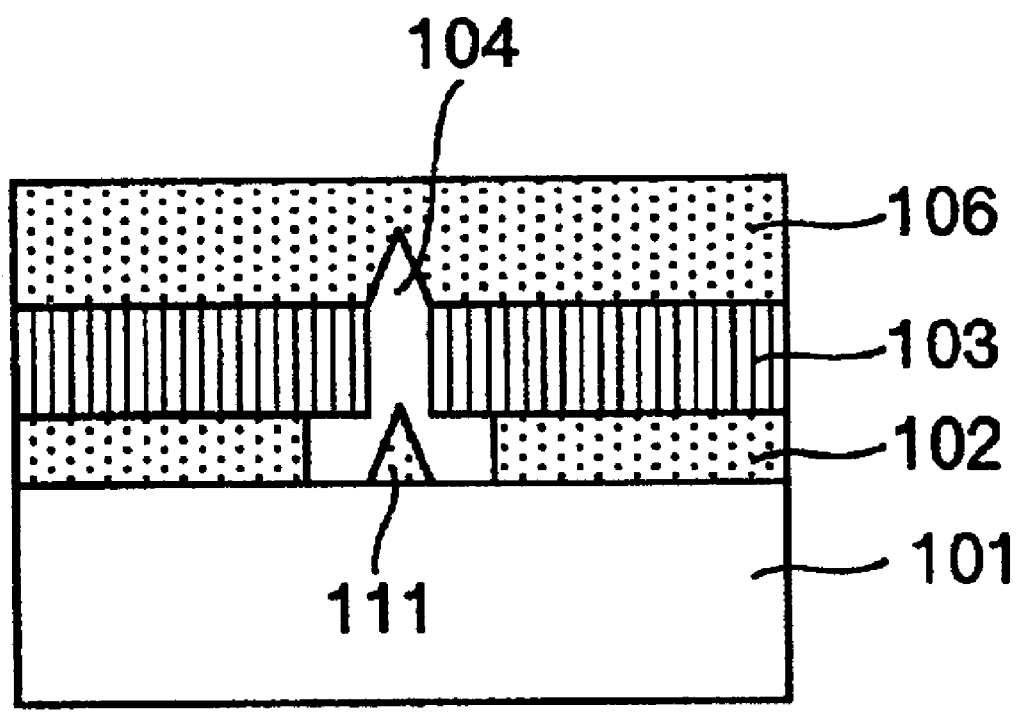
FIG. 13 is a cross-sectional view schematically showing a method of fabricating a scatterer having a contour of a circular cone or a polygonal pyramid.

When the scatterer is manufactured in a shape of a circular cone (FIG. 2A), the resist is exposed to light in a corresponding circular contour in the exposure step above (the circular contour has a radius equal to or less than a wavelength of light). In the scatterer forming process in which a metallic film 106 is accumulated on the resist film 103, as the thickness of the metallic film 106 increases, the metal is also accumulated on a surface the opening 104 and hence the opening is gradually minimized in size. That is, by accumulating the metallic film until the opening is completely filled with the metal, the scatterer is resultantly manufactured in the form of a circular cone (FIG. 13).

Figure 4C:
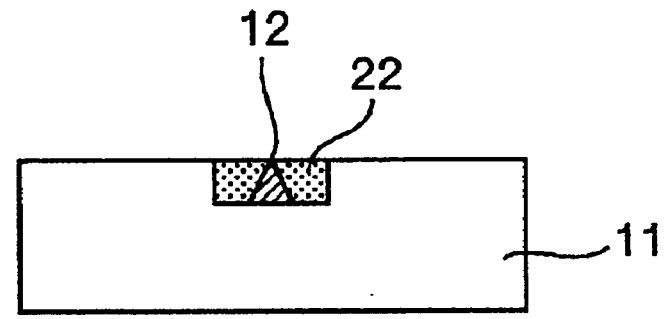
Figure 4D:
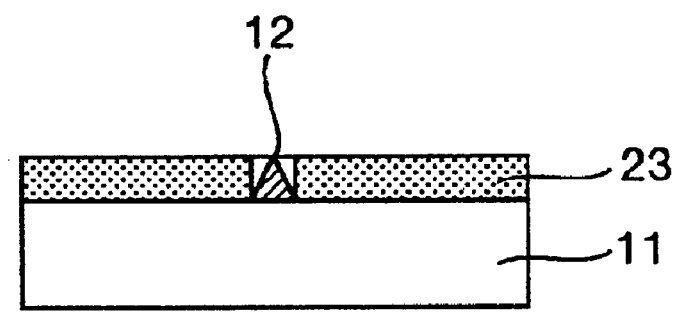

When a metallic scatterer is fabricated in a dip of the substrate as shown in FIGS. 4A and 4C, the first film forming process is skipped and the resist is directly coated on the substrate. In place of the film etching process, a substrate etching process is additionally conducted to etch the substrate. When the substrate is made of a nonconductive substance such as quartz, to prevent in the electron-beam exposure the disadvantage that the substrate is charged and a target pattern is extended, a conductive, transparent film of, for example, ITO is manufactured on the substrate, the film having a thickness of several tens of nanometers or less, by sputtering or vacuum evaporation before the resist coating process.

Alternatively, The near-field probe may be produced as follows.

Figure 14A:

As can be seen from FIG. 14A, a film 102 of a metal, a dielectric, or a semiconductor is formed on a substrate 101 by a vacuum evaporator or a sputtering device. The film has thickness equal to height of a target scatterer.

Figure 14B:

As shown in FIG. 14B, a film 123 is removed by photolithography or electron-beam lithography, from a region in which the scatterer is fabricated.

Figure 14C:
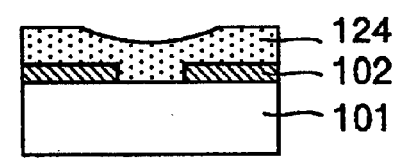
Figure 14D:
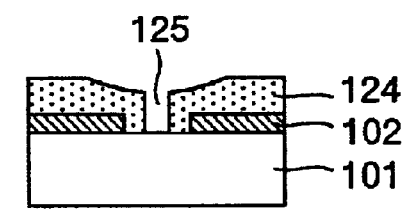
Figure 14E:
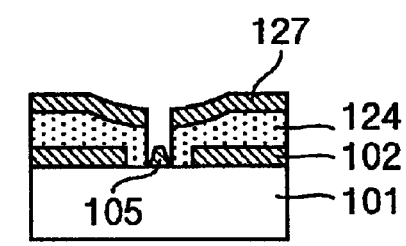
Figure 14F:
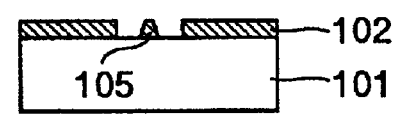

A positive, electron-beam resist is coated (FIG. 14C) and a region 125 to form the scatterer is exposed to light by an electron-beam exposure device (FIG. 14D). The resist is then removed from the exposed region 125 in developing liquid.

As shown in FIG. 14D, a metal is accumulated on the resist film 124 by a vacuum evaporator. The scatterer 105 is resultantly fabricated in the space 125 from which the resist has been removed.

The resist film 124 and the metallic film 127 thereon are finally removed in resist removing solution.

When the metallic scatterer is formed in a dip of the substrate as shown in FIGS. 4A and 4C, the first film forming process is removed and a process is additionally used to directly form a dip on a surface of the substrate by photolithography or the like.

Moreover, the near-field probe may be produced as follows.

A film 102 of a metal, a dielectric, or a semiconductor is formed on a substrate 101 by a vacuum evaporator or a sputtering unit (FIG. 15A). The film has thickness equal to height of an objective scatterer.

A positive, electron-beam resist is coated on the film 102 (FIG. 15B). As can be seen from FIG. 15C, a region 134, corresponding to the region 16 between the scatterer 12 and the film 13 of FIGS. 1A and 1B, is exposed by an electron-beam exposure device. The resist is then removed from the exposed region 134 in developing liquid.

The film 102 in the region 134 from which the resist has been removed is removed in etching solution or by plasma etching as shown in FIG. 15D.

Finally, the resist film 133 is removed (FIG. 15E).

Alternatively, the near-field probe may be produced using a negative resist as follows.

A positive resist 141 is coated on a substrate 101 (FIG. 16A). When the substrate is made of a nonconductive substance such as quartz, to prevent in the electron-beam exposure a disadvantage that the substrate is charged and a target pattern is extended, a conductive, transparent film of, for example, ITO (the film thickness is, for example, several tens of nanometers) is manufactured on the substrate before the resist coating process.

The resist other than that of a region 142, which corresponds to the region 16 between the scatterer 12 and the film 13 in FIGS. 1A and 1B, is removed by electron-beam exposure (FIG. 16B).

A metallic film is accumulated by a vacuum evaporator (FIG. 16C). This forms a scatterer 105 and a film 144 in a periphery of the scatterer 105.

Finally, the resist film 142 and the metallic film thereon are then removed in resist removing liquid (FIG. 16D).

The near-field optical probe including a scatterer 12 protected by a dielectric film 22 (FIGS. 4B and 4C) is fabricated as follows.

Figure 17A:
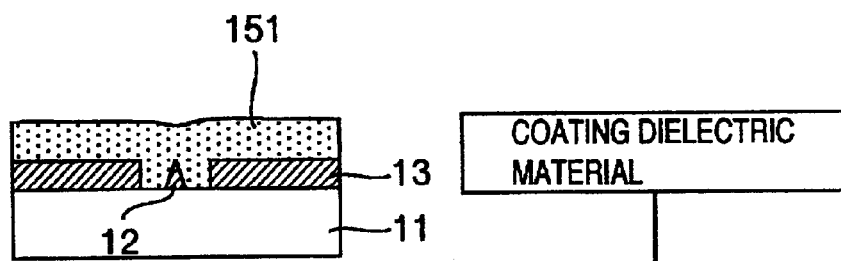
Figure 17B:
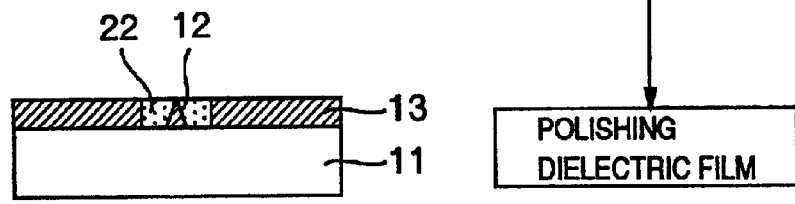

A dielectric film 151 is manufactured on the scatterer 12 and the peripheral film 13 by a vacuum evaporator or a sputtering device (FIG. 17A).

The region other than the scatterer 12 and the peripheral film 13 are polished and is removed by an abrasive. The abrasive is, for example, diamond slurry, alumina slurry, or silica slurry.

When the near-field probe is located near a sample to be scanned, the position of the probe varies according to unevenness of a surface of the sample. Particularly, when the probe is used in an optical recording/reading device, the position of the probe is considerably changed by inclination and/or distortion of a disk. Resultantly, the position of incident light on the probe is shifted and quantity of light hitting the metallic scatterer changes. To prevent this difficulty, there is required an automatic adjuster to set the position of incident light to the metallic scatterer in any situation. This adjustment is accomplished as follows.

Figure 18:
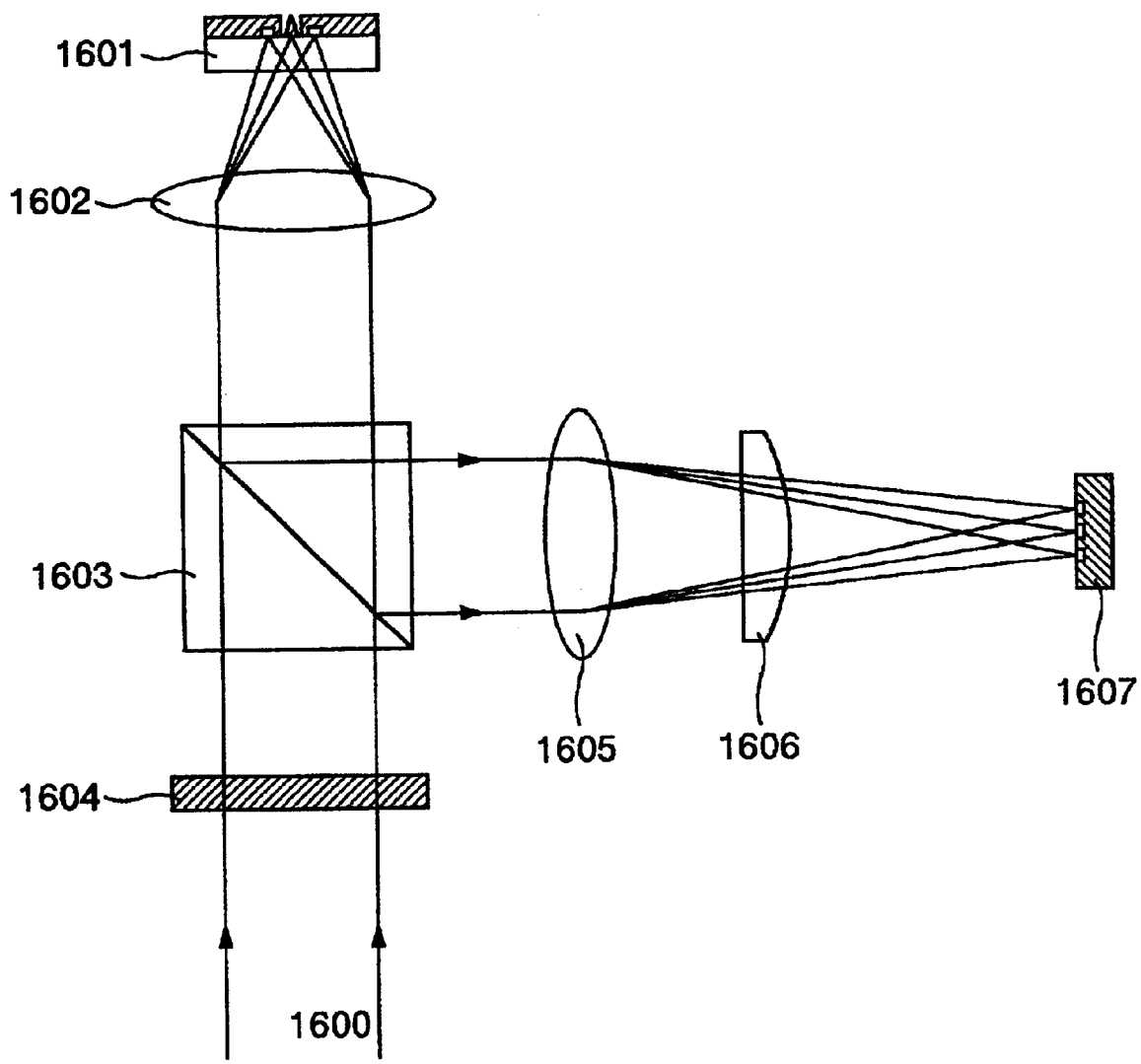
FIG. 18 is a schematic diagram showing an automatic focal point adjusting method.

A collimated light beam 1600 is separated into two beams of light including a first beam and a second beam, by a grating or a Wollaston prism 1604 (FIG. 18). At a place near the scatterer of the probe, a focusing mark is disposed. The first beam hits the scatterer 1609 and the second beam hits the focus adjusting mark. By measuring a shape of light beam reflected from the mark, the focal point is adjusted.

Figure 19A:
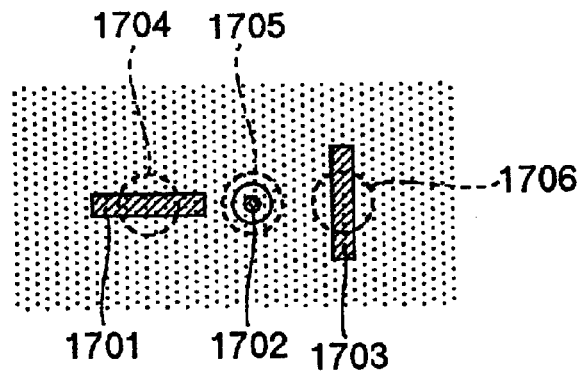
Figure 19B:
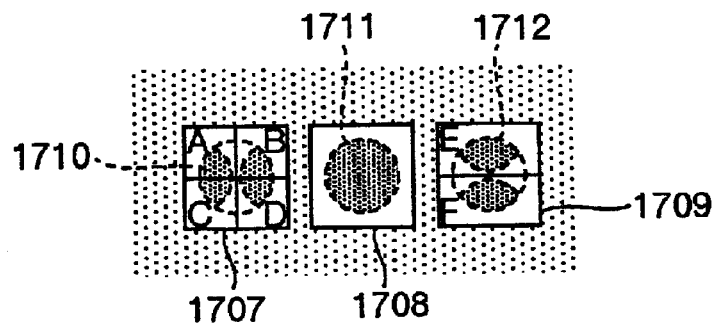

The adjusting device is specifically configured as follows. At a position near a scatterer 1702, two small and elongated grooves 1701 and 1703 are fabricated (FIG. 19A). Each groove has width smaller than the light spot diameter and depth equal to λ/8n (λ is a wavelength of light and n is the refractive index of the substrate). These grooves are orthogonal to each other. The light beam is separated into three beams, i.e., a first beam, a second beam, and a third beam, by a grating or a Wollaston prism 1604. The first beam 1705 hits the scatterer 1702 and the second and third beams hit central sections respectively of the grooves 1701 and 1703. Reflection beams of the beams 1704 to 1706 are separated from the incident light by a beam splitter 1603 to be fed via an convex lens 1605 and a cylindrical lens 1606 to a sensor 1607. The sensor 1607 includes three light receiving surfaces. A light receiving surface 1707 on the outer-left side includes four subordinate surfaces, and a light receiving surface 1703 on the outer-right side includes two subordinate surfaces (FIG. 19B).

Figure 19C:
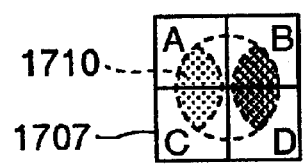

A direction parallel to the substrate surface is aligned as follows. On the light receiving surfaces, the light beam has contours 1710 to 1712. The central beam 1711 is light reflected from the scatterer and the beams 1710 and 1712 respectively on both sides of the central beam 1711 are lights reflected from the grooves 1701 and 1703. The light reflected from the grooves has a pattern including two bright areas (FIG. 19B) by interference between diffracted light from the grooves. When the focal point is appropriately adjusted, these areas are equal in brightness to each other. When the focal point is shifted from the appropriate position, the areas are different in brightness from each other (FIG. 19C). Therefore, by setting two areas to equal brightness, the focal point can be adjusted (signals from the sensor satisfy (A+B)−(B+D)=0 and E−F=0).

Figure 19D:
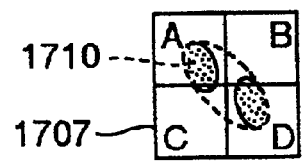

In a direction vertical to the substrate surface, the positioning is achieved as follows. By using, for example, an aspherical aberration system, an optical element to cause aspherical aberration such as a cylindrical lens is inserted in the optical sensor system. While the focal point is in an appropriately focused state, the positioning is conducted such that a minimum circle of confusion is formed on the sensor. When the focal point is thus adjusted, the reflection light has a circular contour as shown in FIG. 19B. However, when the focal point is shifted from the appropriate position, the reflection light becomes non-collimated light. Therefore, the light passed through the convex lens 1605 and the cylindrical lens 1606 has an elliptic shape as shown in FIG. 19D. Consequently, by setting the beam shape to a circle, the focal point can be appropriately adjusted (signals from the sensor satisfy (A+D)−(B+D)=0).

Figure 20A:
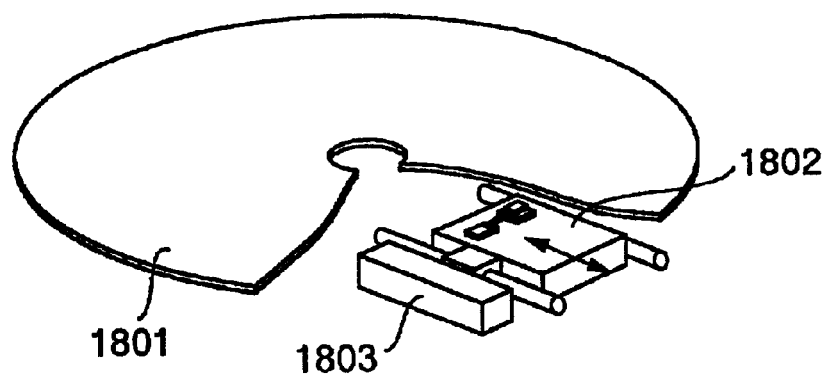
Figure 20B:
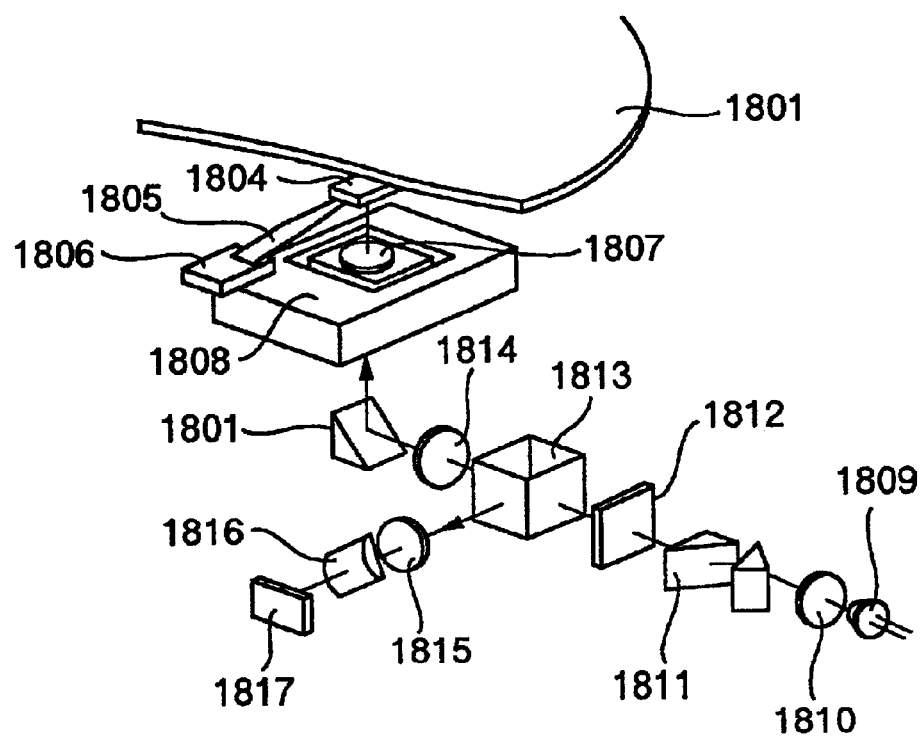

FIG. 20A shows an application example of the near-filed optical probe to an optical reading/reproducing device. The optical probe is installed in an optical head 1802 including an optical source, a sensor, and the like. The optical head 1802 is located to a position near a disk 1801. The optical head 1802 is moved in a radial direction of the disk 1801 by a carriage actuator 1803. The optical head 1802 includes an optical system constructed as shown in FIG. 20B. The optical system includes a semiconductor laser 1809 as a light source. Light from the laser 1809 is passed through a collimating lens 1810 and a beam shaping prism 1811 into a circular, collimated beam. The beam passes through a grating 1812, a polarizing beam splitter 1813, a quarter wavelength plate 1814, a mirror 1801 and an objective lens 1807, which collectively serve as a focus adjusting unit, and enters the optical probe 1804. The position of the objective lens 1807 is adjusted by an actuator 1808. An actuator 1806 is used to precisely adjust the position of the optical probe 1804 for tracking operation. The optical probe 1804 is attached to a suspension 1805 and is pushed against the disk 1801 by force of the suspension. Light reflected from the optical probe 1804 is separated from the incident light by the polarizing beam splitter 1813 and passes a condenser 1815 and a positioning cylindrical lens 1816 to be incident to a sensor 1817.

Figure 21A:
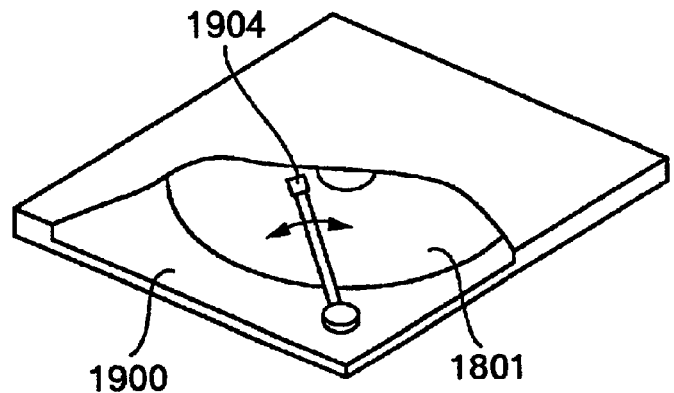
Figure 21B:
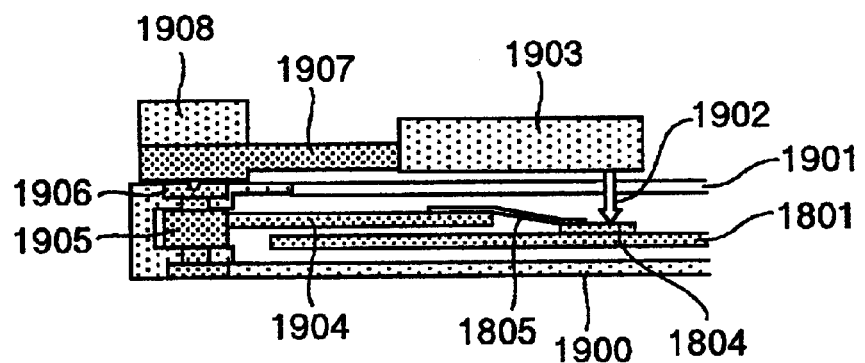
Figure 21C:
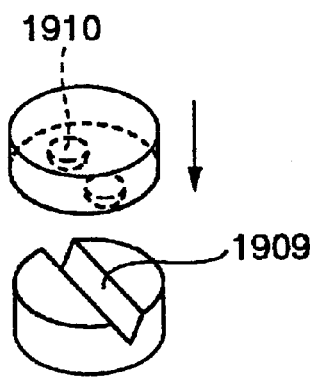

In the optical recording device, since the recording layer is exposed in the recording disk surface, when the disk 1801 is removed from the optical head 1802 to be carried about, there exists a fear of dirt and damage on the disk and data recorded thereon cannot be reproduced in some cases. To prevent this difficulty, it is favorable that the disk 1801 and the near-field optical probe 1804 are housed in a cartridge 1900 to isolate the disk surface and the optical probe 1804 from the outside air as shown in FIGS. 21A to 21C. For example, a rotating shaft is disposed on a corner of the cartridge 1900, an arm 1904 is attached to the rotating shaft, and the suspension 1805 and the optical head 1801 are attached to the arm 1904 as shown in FIG. 21B. The tracking is carried out by moving the arm 1904 while rotating the rotating shaft 1905. The main section of optical head 1903 including the light source and the sensor is placed outside the cartridge 1900. Light 1902 from the main section of optical head 1903 is fed via a window 1901 to the optical probe 1804. The light 1902 is collimated. The light incident to the optical probe 1804 is condensed by a condensing mechanism constructed on the probe as shown in FIG. 9C. The main section of head 1903 is mounted on an arm 1907 driven by a rotating actuator 1908. The arm 1907 is coupled with the rotating shaft 1905 connected to the optical probe 1804. Resultantly, the main section of head 1903 and the optical probe 1804 operate in a cooperative fashion. To connect, with high precision, the rotating shaft 1905 coupled with the optical probe 1804 to the arm 1907 attached to the main section of head 1903, a v-shaped groove 1909 and a projection 1910 are employed as shown in FIG. 21C. Specifically, a v-shaped groove 1909 is disposed in an upper section of the rotating shaft 1905 and semi-spherical projections 1910 are arranged in a lower section of the arm 1907 of the main section of head 1903. By pushing the semi-spherical projections 1910 against the v-shaped groove 1909, the arm 1907 of the main section of head 1903 can be linked with the rotating shaft 1905.

Figure 22A:
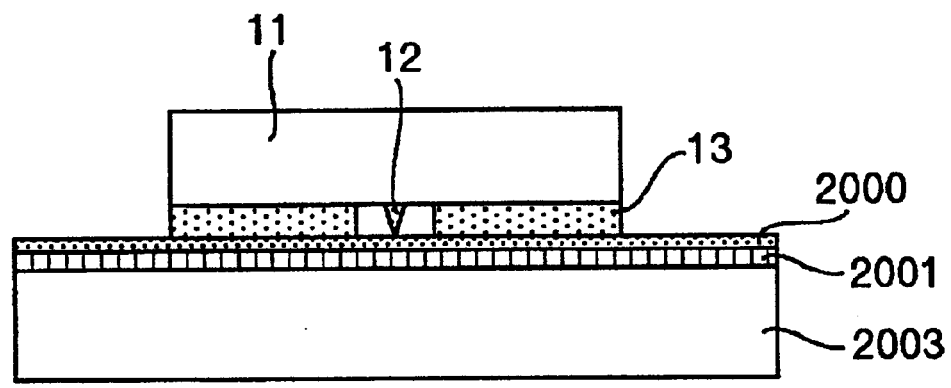
Figure 22B:
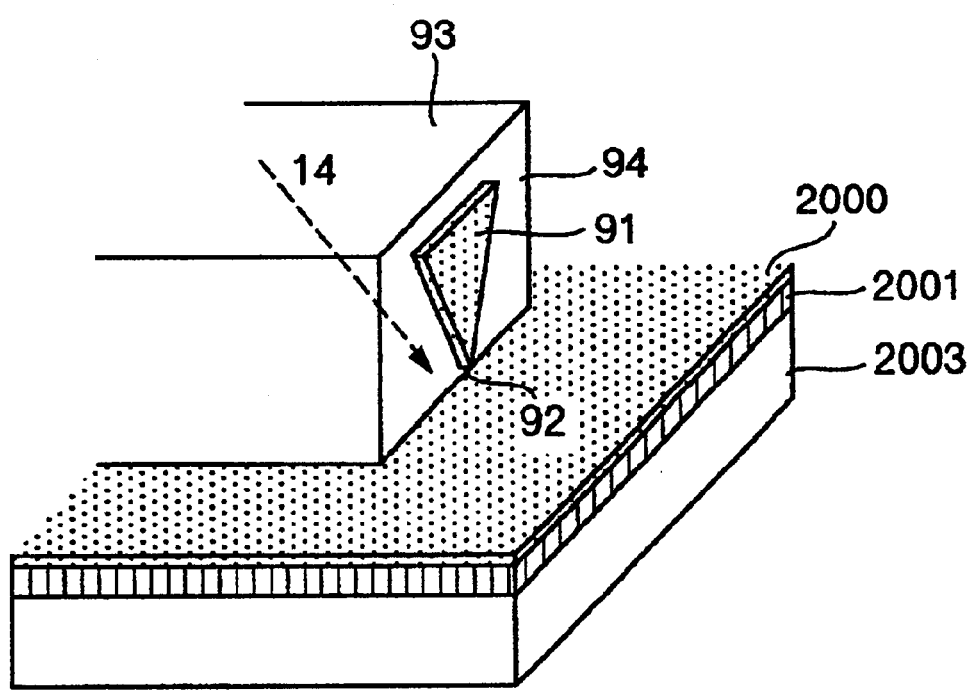

When the probe includes a metallic scatterer in the contour of a circular cone (FIG. 2A) or when the probe includes a metallic film with a pointed tip end in the contour of a triangle or a planar ellipse on a side surface of the substrate (FIGS. 8A and 8B), a metallic layer is favorably disposed below the recording layer of the disk (FIGS. 22A and 22B). For example, a metallic layer 2001 of gold or silver is manufactured on a disk substrate 2003 and a recording layer 2000 having a thickness of about 5 nm is fabricated thereon using a phase-changing material. In this configuration, dipole in the metallic scatterer 12 interacts with dipole in the metallic film 2001 to resultantly increase intensity of near-field light between the tip end of the metallic scatterer 12 and the metallic film 2001. This also improves efficiency of the optical probe.

In the near-field optical probe according to the present invention, the near-field light is generated by a metallic scatterer in the contour of a circular cone, a polygonal pyramid, a planar ellipse, or a triangle. Therefore, it is possible to generate quite strong near-field light. The optical probe includes in a peripheral area of the scatterer a film of a metal, a dielectric, or a semiconductor with film thickness equal to height of the scatterer. Consequently, the probe can conduct the scanning at a high speed without destroying the scatterer. When the film is made of a light shielding substance and the distance between the scatterer and the film is equal to or less than a wavelength of light, the background light can be reduced.

While the present invention has been described in detail and pictorially in the accompanying drawings, it is not limited to such details since many changes and modifications recognizable to those of ordinary skill in the art may be made to the invention without departing from the spirit and scope thereof.

What is claimed is:

1. A near-field optical probe, comprising:
   a substrate; and
   a metallic scatterer fabricated on said substrate in a contour of a circular cone or a polygonal pyramid having an axis vertical to a surface of the substrate;
   wherein a localized plasmon is excited inside of said metallic scatter.

2. A near-field optical probe according to claim 1, further including in a periphery of said scatterer a metallic film, a dielectric film, or a semiconductor film having film thickness substantially equal to height of said scatterer.

3. A near-field optical probe according to claim 2, wherein:
   said film is a light shielding film; and
   said scatterer is apart from said peripheral film by a gap equal to or less than a wavelength of light.

4. A near-field optical probe according to claim 2, wherein a gap between said scatterer and said peripheral film or between said scatterer and said dip is filled with a light transmitting material.

5. A near-field optical probe according to claim 1, further including a dip in the substrate surface with depth substantially equal to height of said scatterer, wherein said metallic scatterer is formed in said dip.

6. A near-field optical probe according to claim 1, wherein said substrate is a contour of a semi-sphere.

7. A near-field optical probe according to claim 1, further including a light condensing element on said substrate.

8. A near-field optical probe according to claim 7, wherein said light condensing element is a holographic lens.

9. A near-field optical probe according to claim 1, wherein said metallic scatterer is formed on an edge surface of an optical resonator.

10. A near-field optical probe according to claim 1, wherein said metallic scatterer is formed on a light emitting edge surface of a semiconductor laser.

11. A near-field optical probe, comprising:
    a substrate; and
    a metallic scatterer fabricated on said substrate in a contour of a planar ellipse having a major axis, a minor axis, and thickness, the major axis, the minor axis, and the thickness being equal to or less than a wavelength of light.

12. A near-field optical probe, comprising:
    a substrate; and
    a metallic scatterer fabricated on said substrate in a contour of a triangle having a vertex with a radius of curvature and thickness, the radius of curvature and the thickness being equal to or less than a wavelength of light.

13. A near-field optical probe according to claim 12, wherein the triangle is connected to a film in a periphery of the triangle on the plane to dispose an opening in the connecting section, the opening having a radius of curvature greater than a radius of curvature of the vertex of the triangle.

14. A near-field optical probe, comprising:
    a substrate; and
    a metallic scatterer fabricated on said substrate in a contour of a triangle having a first vertex, second vertex, and a third vertex, the first vertex having a radius of curvature less than a radius of curvature of each of the second and third vertices.

15. A near-field optical probe, comprising a substrate on which a metallic film having a pointed tip end and a metallic film having an arbitrary contour are formed for generating a plasmon resonance, in which an interval between the pointed tip end metallic film and the arbitrarily contoured metallic film is equal to or less than 50 nm.

16. A near-field optical probe, comprising a substrate on which two metallic films each having a pointed tip end are formed for generating a plasmon resonance, in which an interval between the pointed tip ends is equal to or less than 50 nm.

17. A near-field optical probe, comprising:

a substrate; and a metallic film having a pointed tip end in a contour of a planar ellipse or a triangle on a side surface or an inclined side surface of the substrate, said pointed tip end being brought into contact with a surface of a sample.

18. A near-field optical probe according to claim 17, wherein said metallic film on the side surface of the substrate is coated with a transparent dielectric substance.

19. A near-field optical probe according to claim 18, wherein said near-field optical probe forms part of a near-field microscope.

20. A near-field optical probe according to claim 17, wherein said near-field optical probe forms part of an optical recording/reading device.

* * * * *